(12) United States Patent
Argueta-Diaz et al.

(10) Patent No.: US 6,760,140 B1
(45) Date of Patent: Jul. 6, 2004

(54) BINARY OPTICAL INTERCONNECTION

(75) Inventors: Victor Argueta-Diaz, Columbus, OH (US); Betty Lise Anderson, Columbus, OH (US); Stuart A. Collins, Jr., Worthington, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 10/086,355

(22) Filed: Mar. 1, 2002

(51) Int. Cl.[7] ................................. G02F 1/03
(52) U.S. Cl. ............... 359/245; 359/251; 359/255
(58) Field of Search ................. 359/245, 254, 359/251, 255, 256, 322; 385/8, 2, 3, 27, 28, 33, 35, 147; 372/26, 27, 28, 12

(56) References Cited

U.S. PATENT DOCUMENTS

| | | | |
|---|---|---|---|
| 4,225,938 A | 9/1980 | Turpin | 708/816 |
| 4,474,434 A | 10/1984 | Carlsen et al. | 359/320 |
| 4,474,435 A | 10/1984 | Carlsen et al. | 359/320 |
| 5,117,239 A | 5/1992 | Riza | 342/375 |
| 5,319,477 A | 6/1994 | DeJule et al. | 349/65 |
| 5,463,497 A | 10/1995 | Muraki et al. | 359/619 |
| 5,465,175 A | 11/1995 | Woodgate et al. | 359/619 |
| 5,936,759 A | 8/1999 | Buttner | 359/291 |
| 6,014,244 A | 1/2000 | Chang | 259/281 |
| 6,064,506 A | 5/2000 | Koops | 359/237 |
| 6,188,817 B1 | 2/2001 | Goodfellow | 385/24 |
| 6,236,506 B1 | 5/2001 | Cao | 359/484 |
| 6,266,176 B1 | 7/2001 | Anderson et al. | 359/245 |
| 6,388,815 B1 | 5/2002 | Collins, Jr. et al. | 359/633 |
| 6,480,323 B1 | 11/2002 | Messner et al. | 359/298 |
| 6,525,889 B1 * | 2/2003 | Collins, Jr. et al. | 359/836 |

* cited by examiner

Primary Examiner—Hung Xuan Dang
Assistant Examiner—Tuyen Tra
(74) Attorney, Agent, or Firm—Standley Law Group LLP

(57) ABSTRACT

An optical interconnection device and a spot displacement device are presented. In optical interconnection device of the present invention, a spot displacement device is employed to cause a light beam to shift positions, thereby making available output positions not previously available for a light beam having bounced so few times.

20 Claims, 14 Drawing Sheets

BINARY OPTICAL INTERCONNECTION

TECHNICAL FIELD OF THE INVENTION

The present invention is in the field of optical interconnection devices, such as those that may be useful in routing information for communications systems.

BACKGROUND OF THE INVENTION

This invention relates to apparatus supporting optical interconnection, such as those that may be useful in the routing of signals in the communications industry. In communications systems such as telecommunications systems, optical signals currently must be down-converted to an electrical signal before being switched. The bandwidth of these electrical signals is much lower than that of optical signals. This conversion is a barrier to a fast Internet system capable of delivering applications requiring significant bandwidth, such as streaming on-demand video and music. It is therefore desirable to use a system that keeps signals in their optical form without having to convert to a slower, less-efficient electrical system.

One area to be addressed is the electronic switches in fiber-optic backbones. Backbones are expensive communications links between major cities. Optical fibers often carry information to central hubs in these major cities, then creating a bottleneck at each hub while all this information waits to be converted into electrons and switched by bulky electronic switches. Because each fiber carries multiple signals on different wavelengths, the signals must be optically separated before each one can be down-converted and electronically switched.

Because of this, the industry has turned its attention toward photonic switches. Photonic switches do not require signal down-conversions, and are capable of optically directing even complex light streams. Several variations of these photonic switches have been reported. Agilent reportedly uses bubbles to deflect light between crisscrossing glass columns in order to direct light from one switch to the next or back and forth among the switches to get to the various outputs. Corning is reportedly investigating liquid crystals to redirect the light streams. Bell Labs is reportedly using tiny micro-mirrors to direct beams to the appropriate fibers. While these systems are much smaller that the previous switching systems, and may effectively achieve the desired optical switching, they can be very complex. For example, in the Bell Labs device where an array of micromirrors is used to direct beams to the appropriate fiber, each mirror must be accurately calibrated to send a beam to any of the appropriate fibers. The calibration must also take into account any minute variation in position from fiber to fiber, an array of fibers not being aligned in perfect rows and columns.

In earlier optical interconnection devices, such as those described in U.S. Pat. No. 6,266,176, the number of possible outputs to which a given input could be switched was related to the number of bounces, m, a beam made in a White cell raised to some power ($m^1$, $m^2$, etc.). In the present invention, we present a binary switch, in which the number of outputs is proportional to $2^m$, which will in general be a much larger number. We also describe a family, of higher order interconnection devices, in which the number of outputs is proportional to $3^m$, $4^m$, etc. Thus, for a given number of bounces, each input can be switched to a larger number of outputs than earlier designs.

It is therefore an object of the current invention to create a photonic switching system that is compact in design, relatively simple to setup and operate, and can effectively route multiple complex light streams.

Although described with respect to the field of communications, it will be appreciated that similar advantages of optical routing, as well as other advantages, may be obtained in other applications of the present invention. Such advantages may become apparent to one of ordinary skill in the art in light of the present disclosure or through practice of the invention.

SUMMARY OF THE INVENTION

The present invention presents a dual-White cell approach for creating the multiple bounces, but it will be recognized that other methods of producing multiple bounces exist (as described in U.S. Pat. No. 6,266,176 and in pending application Ser. No. 09/688,478, each incorporated herein by reference). Also presented are designs based on a liquid-crystal spatial light modulator, but it will be shown that other spatial light modulators, including micro-electro-mechanical machine (MEM) devices such as a digital micromirror device, can be used instead. Adapting the dual-White cell to MEM's has been discussed in U.S. Pat. No. 6,266,176 as well.

An optical interconnection device of the present invention includes at least one input light source for generating at least one individual light beam. Each individual light beam emerges from its respective input light source and enters a first optical configuration. The first optical configuration is adapted to receive each individual light beam and to direct each individual light beam to a spatial light modulator. The first optical configuration comprises a plurality of optical elements configured so as to define a plurality of possible light paths for each individual light beam. After being directed to the spatial light modulator, an individual light beam may be directed to a second optical configuration. The second optical configuration is adapted to receive the individual light beams reflected from the spatial light modulator. The second optical configuration comprises at least one spot displacement device.

In a preferred device of the present invention, each light beam is introduced by an input light source. Each light beam is received by the first optical configuration before being directed to a spatial light modulator. The spatial light modulator may reflect each light beam either back to the first optical configuration or to a second optical configuration. A light beam reflected to the second optical configuration may encounter a spot displacement device. Eventually each light beam is directed to a receiving device adapted to receive light beams exiting the optical interconnection device. The optical interconnection device is therefore capable of providing a multitude of outputs for a given input.

In a second embodiment of the present invention, the first optical configuration may additionally comprise at least one spot displacement device.

Irrespective of embodiment, it is preferred that the first optical configuration comprises a first plurality of optical elements comprising mirrors, lenses, gratings, and prisms. It is further preferred that the second optical configuration comprises a second plurality of optical elements comprising mirrors, lenses, gratings, and prisms.

It is also preferred that each spot displacement device comprise at least one column, each spot displacement device being capable of shifting a given light beam by at least one row on the spot displacement device thereby causing the returning light beam to be shifted on the spatial light modulator. It is most preferred that each additional column of the spot displacement device displace the light beam by twice (or more) the displacement of the previous column. For example, the first column would displace a light beam by one, the second column would displace a light beam by two, the third column would displace a light beam by four, etc.

It is also preferred that each spatial light modulator be selected from the group consisting of liquid crystal spatial light modulators, two-state micro-electro-mechanical devices, and three-or-more-state micro-electro-mechanical devices.

In yet another preferred embodiment of the present invention, at least one input light source introduces at least one individual light beam into a first optical configuration. The first optical configuration comprises a plurality of optical elements configured so as to define a plurality of possible light paths and at least one spot displacement device. A given light beam may pass to the spatial light modulator before entering a second optical configuration. The second optical configuration comprises a plurality of optical elements configured so as to define a plurality of possible light paths. The spatial light modulator comprises at least one column, and each column comprises at least two rows. The spatial light modulator is adapted to select a light path from among the possible light paths for a given light beam and to direct the light beam to the selected path. The spot displacement device is capable of shifting a given light beam on said spatial light modulator by at least one row. A plurality of output positions are available to receive a given light beam, thereby removing the light beam from the optical interconnection device.

In a preferred embodiment of the present invention, the time it takes a given light beam to traverse the optical interconnection device is the same as all other light beams. Further, in preferred optical interconnection device, a given light beam may be directed to a given output position by either the first optical configuration, the second optical configuration, or by the spatial light modulator. A preferred device may additionally comprise at least one spot displacement device in the second optical configuration. Additionally, it is preferred that the first plurality of optical elements comprise optical elements selected from the group consisting of mirrors, lenses, gratings, and prisms. It is further preferred that the second plurality of optical elements comprise optical elements selected from the group consisting of mirrors, lenses, gratings, and prisms.

In a preferred optical interconnection device of the present invention the spot displacement device comprises at least one column, each spot displacement device being capable of shifting a given light beam by at least one row on said spot displacement device and thus on the spatial light modulator. It is most preferred that each additional column on the spot displacement device is capable of displacing the light beam by twice (or more) the displacement of the previous column.

It is also preferred that each spatial light modulator be selected from the group consisting of liquid crystal spatial light modulators, two-state micro-electro-mechanical devices, and three-state micro-electro-mechanical devices.

The present invention also provides a spot displacement device, comprising at least one column. The spot displacement device shifts a light beam by at least one row on the spot displacement device. Each additional column of the spot displacement device is capable of displacing a light beam by twice (or more) the displacement of the previous column.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which.

DETAILED DESCRIPTION OF THE PREFERRED EMBODIMENT(S)

In accordance with the foregoing summary, the following presents a detailed description of the preferred embodiment of the invention that is currently considered to be the best mode.

Figure 1:
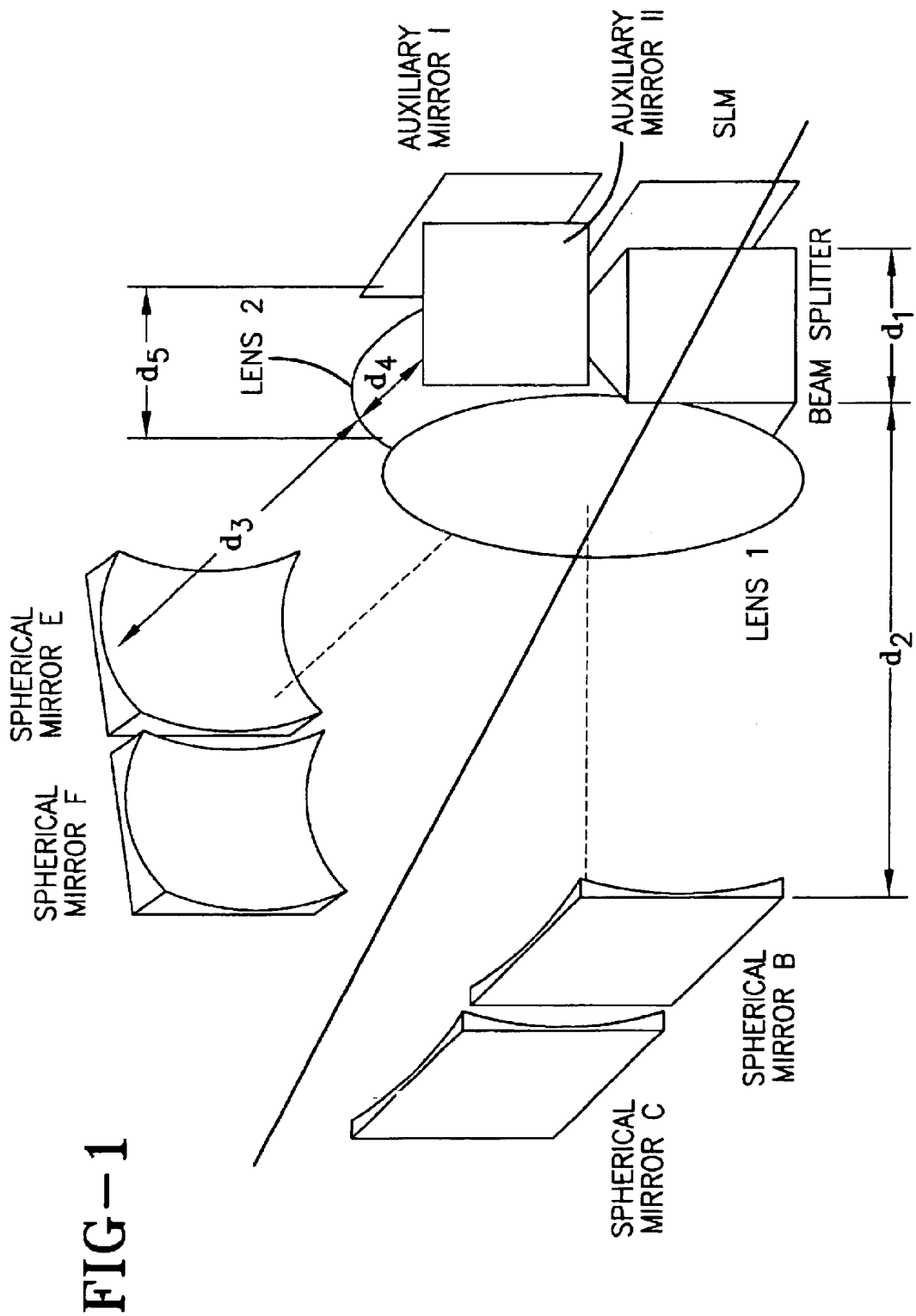
FIG. 1 shows a double arm White cell of the present invention.

Two white cells united by a spatial light modulator and a polarizing beam splitter are shown in FIG. 1. One White cell consists of the spatial light modulator (SLM), lens 1, Mirrors B and C, and Auxiliary Mirror I. The other consists of the SLM, lens 2, Mirror E and F, and Auxiliary Mirror II. Auxiliary Mirror II will later be replaced with a mechanism for shifting the spot patterns to new outputs. For the purposes of illustrating the operation of the dual cell, however, we will take it to be a simple mirror in this section. The distances indicated in the figure will be referred to later.

As in previous cases a given light beam enters the White Cell via a spot on a turning mirror (not shown), and goes to Mirror B. From Mirror B the light is focused to a new spot on the spatial light modulator (SLM). If the SLM doesn't change the light's polarization the light will pass through the polarizing beamsplitter (PBS), go to Mirror C, be imaged as a new spot on Auxiliary Mirror I by Mirror C, and from there back go to the SLM (via mirror B and the PBS).

If instead the light's polarization in changed by the SLM, the light will be directed to Mirror E by the polarizing beam splitter. Mirror E will create a spot on Auxiliary Mirror II, and from there the lights will go back to the SLM (going through mirror F). Lens I images mirror B onto C and Lens 2 images mirror E onto F. We know from previous work that the even bounces lie on the auxiliary mirror (I or II), and that the odd bounces will lie on the SLM.

Figure 2:
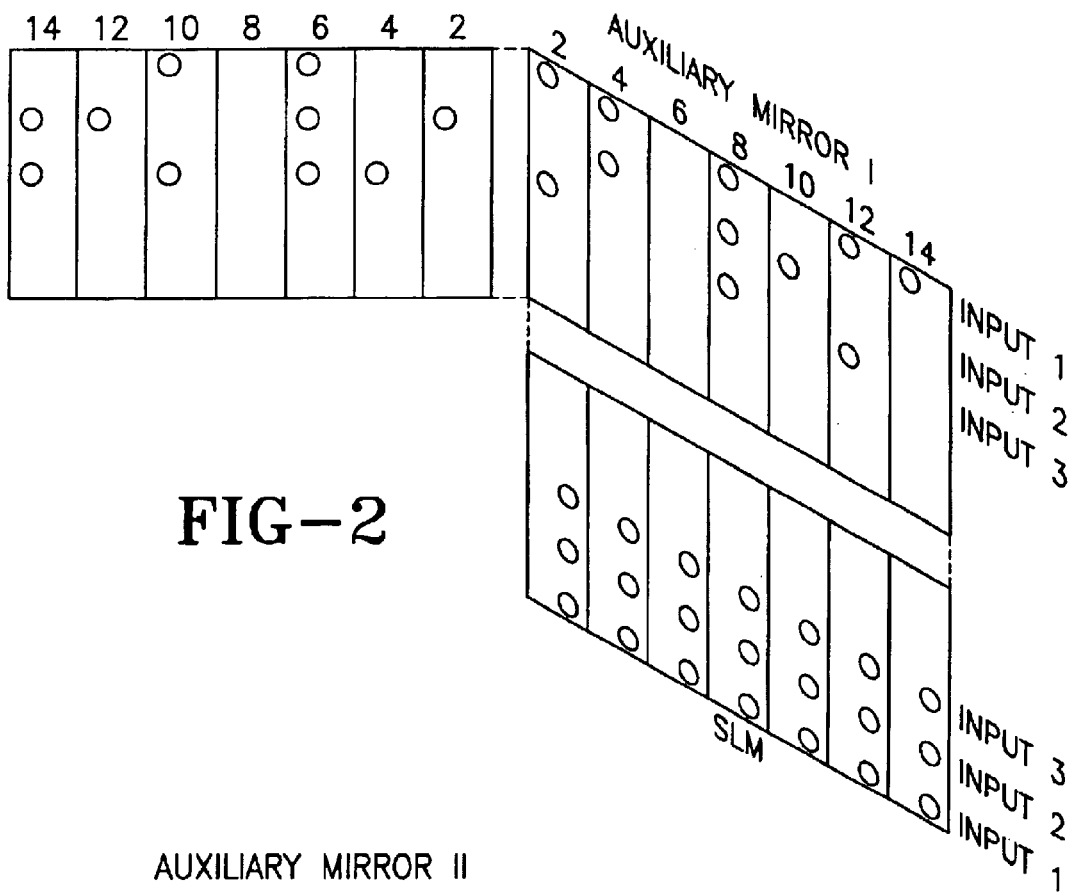
FIG. 2 illustrates the spot pattern formed on the SLM, Auxiliary Mirror I and Auxiliary Mirror 2 for several inputs in the double arm White cell of FIG. 1.

FIG. 2 shows how the spot pattern is formed on the SLM, on Auxiliary Mirror I and Auxiliary Mirror II for several inputs. The odd-numbered spots form on the SLM. The even-numbered spots form on either Auxiliary Mirror I or II depending on the state of the pixel at the previous odd-numbered spot. We can see in FIG. 2 that the light spots will lie in columns on Auxiliary Mirror II. We will take advantage from this characteristic to develop our Binary Interconnection Device.

Each beam will trace out an identical and unique spot pattern on the SLM regardless of which path is chosen. This happens because the centers of curvature of Mirror B is co-located with that of Mirror E, and the center of curvature of Mirror C is superimposed on that of Mirror C. This is different than the approach used in our previous designs. There, the spots were made to shift by aligning these centers of curvature differently. Here, the spots will be made to shift by the introduction of a spot displacement device, described later.

Additionally, if the distance from Lens I to Mirror B or C is the same as the distance from Lens 2 to Mirror E or F then we will see no difference in the time it takes a beam to transverse the cell, regardless of the path it takes.

As mentioned earlier, we will replace Auxiliary Mirror 11 with a device that will shift a spot over by some number of pixels. The mechanism for producing the shifts will be discussed in the next section, but here we will say that number of pixels by which a spot is shifted will be different for different columns in what used to be Auxiliary Mirror II. Each column will shift a beam by a distance equal to twice that of the previous column, producing a binary counting system.

Figure 3:
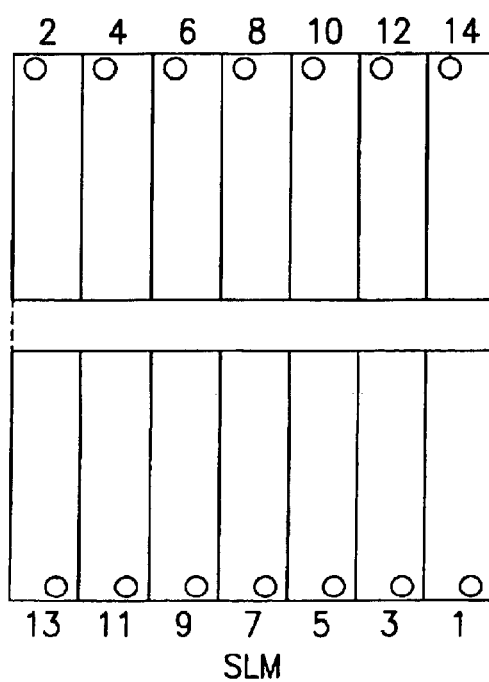
FIG. 3 shows the spot pattern for single input on the SLM and Auxiliary Mirror II.

The spot pattern for a single input beam on Auxiliary Mirror II and on the SLM is shown in FIG. 3. The odd-numbered spots form on the SLM on the bottom, and on Auxiliary Mirror II on the top (assuming the beam is switched to Auxiliary Mirror II on every bounce). As we can see also, the spots lie in columns, and the number of columns will depend on the number of bounces (m) that the light makes. For example, if we need eight columns (which will correspond to 128 different outputs), the light must perform sixteen bounces so we can have eight columns on the SLM and eight bounces that can go to Auxiliary Mirror II. A beam going to Auxiliary Mirror II (or more accurately its replacement) on the second bounce (column 2) will be shifted by one increment, that is, the returning beam will emerge from column 2 one row down (not shown). A beam landing on Auxiliary Mirror II on the fourth bounce will be shifted by two rows, on the sixth bounce four rows, and so on. On any given bounce, if a beam is not to be shifted at all it is sent to Auxiliary Mirror I, which does nothing except keep the bounces going.

The number of columns on Auxiliary Mirror II, will thus determine the number of possible outputs. Every two bounces allows for one bit, so sixteen bounces will produce 128 different outputs for a single input. The method for creating this number of outputs is the subject of this document.

Spot Displacement Device Considerations

In this section we will discuss how the shifts are produced. The first step in creating the Binary Interconnection Device (BID) is to substitute a Spot Displacement Device (SDD) for Auxiliary Mirror II. Recall that the objective is to treat each column on the equivalent plane of Auxiliary Mirror II as an independent entity. A spot landing on the first column experiences a displacement of one increment or pixel. This shifts the spot onto a new row of pixels on the SLM as in previous designs. A spot directed to the second column will be shifted by a displacement of two rows, the third column by four rows and so on.

Each column on Auxiliary Mirror II will have a corresponding column on Auxiliary Mirror I. Thus, if we don't need any displacement on that bounce, the light is sent to Auxiliary Mirror I (this will represent a '0' in a binary counter). If a particular displacement is needed, we can direct the light to a specific column on the SDD (a '1' in a binary counter). Therefore we can add 0s and 1s for an n-bit SDD.

We therefore have the following design criteria: (1) each column of the SDD has to produce double the displacement of the previous column (1 for the first one); (2) the time it takes a beam to propagate through one White Cell and the SDD should be the same as the transit time through the other White Cell via Auxiliary Mirror I; and (3) the White Cell imaging conditions have to be satisfied by each column for the SLM and SDD by the auxiliary mirror: (a) SLM images onto Auxiliary Mirror I via Mirror B or Mirror C; (b) SLM images onto the entrance plane of the SDD via Mirror E or Mirror F; (c) Mirror B images onto Mirror C; (d) Mirror E images onto Mirror F; and (e) Mirror B images onto Mirror E. This list will help us to design our SDD. In the foregoing sections we will analyze different SDD's that fulfill one or more of the conditions listed above.

Paraxial Ray Matrix Approach to Designating the Spot Displacement Device

We wish to find an optical element (or elements) that will produce the desired shifts in the spot patterns. We will use paraxial optics matrices to find what element(s) can perform the shift while still maintaining the imaging conditions. We are using 3×3 ray matrices to describe whether any element is tilted with respect to the optical axis.

First we are going to define a general matrix X for the SDD:

$$X = \begin{bmatrix} a & b & g \\ c & d & h \\ e & f & i \end{bmatrix} \quad (1)$$

The value of elements a through i in Eq. (1) will define the optical element(s) needed to replace Auxiliary Mirror II and produce the desired shifts.

The White Cell consisting of the SLM, Mirror B, Auxiliary Mirror II, and Mirror C must satisfy the imaging conditions that the SLM image onto Auxiliary Mirror I via C (or B), and that C images onto B. These conditions will determine the focal length of Mirror B, Mirror C, Lens 1 and the distance between Lens 1 and Mirror B (and C). The calculations of these conditions are presented in Appendix A.

Next we turn to the other White cell, which contains the SDD. We analyze three imaging conditions of the White Cell containing the SOD: a) Light images from E to F going through the X element (SDD); b) the SLM images onto the input plane of the SDD (the previous plane of Auxiliary Mirror II) via Mirror E; and c) the SLM images back onto itself via Mirror E, X and Mirror F. The purpose of these conditions is to find the effect that the elements a to i of the X matrix will have on the spot pattern of the light bouncing in the White Cell.

For our first condition (light emerging from E to F going through X) we obtain the following matrix:

$$C_3 = \begin{bmatrix} c(d_3 - d_4) - d & d_3^2 c & d_3 h \\ \frac{d_3(a + d + 2cd_4) - d_4(a + d) - c(d_4^2 + d_3^2) - b}{d_3^2} & c(d_3 - d_4) - a & \frac{h(d_4 - d_3) + g}{d_3} \\ \frac{e(d_3 - d_4) - f}{d_3} & ed_3 & i \end{bmatrix} \quad (2)$$

where $d_3$ is the distance between Lens 2 and Mirror E and Mirror F (as shown in FIG. 1), $d_4$ is the distance from Lens 2 to the imaging plane of Auxiliary Mirror. II, and a through i are the matrix elements of X.

Now in order to have an imaging condition, element $C_3[1,2]=d_3^2 c$ has to be equal to zero. Because $d_3$ cannot be zero, the c element of the X matrix has to be zero. After this consideration, Eq. (2) simplifies as follows:

$$C_3 = \begin{bmatrix} -d & 0 & d_3 h \\ \frac{a(d_3 - d_4) + d(d_3 - d_4) - b}{d_3^2} & -a & \frac{h(d_4 - d_3) + g}{d_3} \\ \frac{e(d_3 - d_4) - f}{d_3} & ed_3 & i \end{bmatrix} \quad (3)$$

When Element $C_3[1,2]=0$ (imaging), other elements of the matrix take on special meaning. Element $C_3[1,1]$ is the magnification. If the magnification is $-1$, for example, an image is formed that is inverted and of the same size as the object. In this case, it means that the light from Mirror E is reproduced on Mirror F. Element $C_3[1,3]$ represents offset in the image location. When this element is zero (usually the case in optical systems), if the object (the light on Mirror E) is centered on the axis, then an image forms at Mirror F also centered on the axis. If this element is not zero, then the light on Mirror F is shifted from the optical axis by an amount equal to the value of the element $C_3[1,3]$. If this offset is big enough, the light can miss Mirror F. Further, the shift will accumulate on every pass. Therefore, we would like to have no offset when light is imaging from Mirror E to Mirror F, requiring that $C_3[1,3]=d_3 h$ be zero. Because $d_3$ cannot be zero, h has to be zero.

Now we are going to analyze the second condition, which is that the SLM images onto the plane of Auxiliary Mirror II via Mirror E. We obtain the following matrix:

$$C_4 = \begin{bmatrix} -1 & -\frac{f_e(d_1 + nd_4 - 2nd_3^2) + nd_3^2}{f_e n} & 0 \\ 0 & -1 & 0 \\ 0 & 0 & 1 \end{bmatrix} \quad (4)$$

where $f_e$ is the focal length of Mirror E, $d_1$ is the thickness of the beam splitter, and n the refractive index of the beam splitter.

To have an imaging condition we require that the element $C_4[1,2]$ be equal to zero. So we need to find a value for $f_e$ that can give us the required imaging condition. Solving for $f_e$ we obtain:

$$f_e = \frac{nd_3^2}{2nd_3 - d_1 - nd_4} \quad (5)$$

Now for our third condition, we are going to image the SLM onto itself going through Mirror E, X and Mirror F. For this condition we obtain the following matrix:

$$C_5 = \begin{bmatrix} a & b & -g \\ 0 & d & 0 \\ -e & -f & i \end{bmatrix} \quad (6)$$

Where a, b, d, e, f, g, and i are the elements of matrix X.

To have an imaging condition, element $C_5[1,2]$ has to be zero, which makes element b of the X matrix equal to zero. From Eq. (6) we can see that the third imaging condition depends only on the characteristics of the elements of X element(s). Our goal is to achieve shifts in the spot images on the SLM, and that position offset depends on the g element of X This offset will give us the row shift that we explained in the second section of this paper.

In the following sections, we examine various physical implementations that produce the desired matrix for X.

Physical Implementation

Prism

Now, we analyze different shapes trying to fulfill the conditions previously mentioned. The key goals are that the imaging conditions are all maintained, that the X element g produce the proper shift in the spots on the SLM, and that the element h be zero to avoid a shift on Mirror F.

Figure 4:
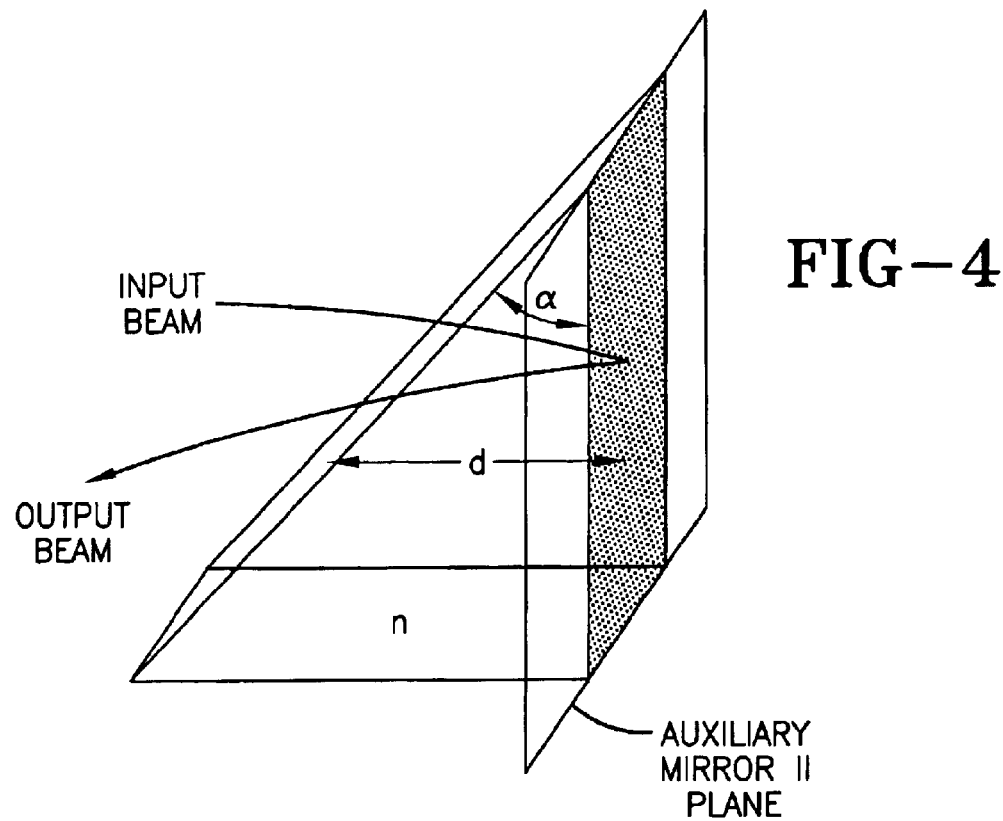
FIG. 4 shows substitution of X element by a prism.

Our first geometry is that of a prism shown in FIG. 4. This prism would be element X, and replace Auxiliary Mirror II. Here we have a right-angle prism of apex angle $\alpha$ and refractive index n. The distance d is the thickness of the prism, which varies with height.

Let us assume a non-small angle approximation. The ray matrix for a round trip through the prism will be:

$$P = \begin{bmatrix} 1 & \dfrac{2d}{n} & 2d\left(\dfrac{1}{n}-1\right)\tan\alpha \\ 0 & 1 & 0 \\ 0 & 0 & 1 \end{bmatrix} \quad (7)$$

As we can see, we have achieved the zero value in the h element. We also notice that the g element (element [1,3], the one that produces the spot displacement) is a function of the prism thickness, the apex angle and the material.

Unfortunately the prism has a big disadvantage, which is inherent to its shape. The thickness of the prism changes depending on the place where the light strikes the prism. If the light goes in near the base, it will have a bigger displacement than light that strikes the prism higher up. Also we can see that the element P[1,2] cannot be zero under any circumstances. This doesn't mean that we cannot have an image condition, but only that the position of the prism has to be different from that of Auxiliary Mirror II. This new position is defined by the following equation:

$$P_{new\_position} = \begin{bmatrix} 1 & x & 0 \\ 0 & 1 & 0 \\ 0 & 0 & 1 \end{bmatrix} \begin{bmatrix} 1 & \dfrac{2d}{n} & 2d\left(\dfrac{1}{n}-a\right)\tan\alpha \\ 0 & 1 & 0 \\ 0 & 0 & 1 \end{bmatrix} \quad (8)$$

The first matrix is the displacement matrix, where x is the distance from the Auxiliary Mirror II to the entrance to the prism. The second matrix is that of the prism. Equation (8) simplifies to:

$$P_{new\_position} = \begin{bmatrix} 1 & \dfrac{2d}{n}+x & 2d\left(\dfrac{1}{n}-1\right)\tan\alpha \\ 0 & 1 & 0 \\ 0 & 0 & 1 \end{bmatrix} \quad (9)$$

From Equation (9) we now can calculate a distance x that will cause an imaging condition for our prism configuration. This distance is x=−2d/n from the Auxiliary Mirror II plane.

It is still the case, however, that the prism thickness d is a function of the height of the beam on the prism.

Parallelogram Prism

Figure 5:
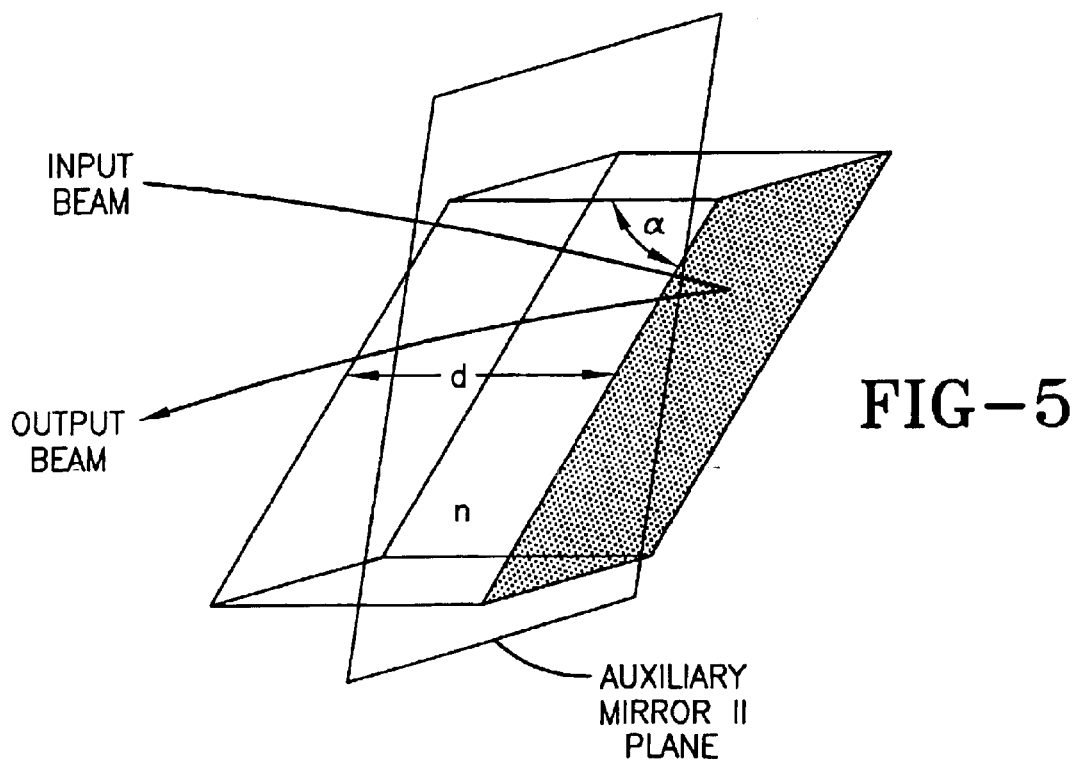
FIG. 5 shows substitution of X element by a parallelogram prism.

To eliminate the thickness variable d we had in the previous design, we propose a parallelogram prism element shown in FIG. 5.

We can see that we now have two tilted surfaces, and the thickness of the double-prism is the same for every spot. For light coming in and out of the parallelogram the ray matrix is:

$$P_2 = \begin{bmatrix} 1 & \dfrac{2d}{n} & 2d\left(\dfrac{1}{n}-1\right)\tan\alpha \\ 0 & 1 & n\tan\alpha \\ 0 & 0 & 1 \end{bmatrix} \quad (10)$$

As we can see we cannot cancel the angular offset of the double prism (element [2,3] is not zero) without eliminating the shift displacement (element [1,3]), unless the quantity n tan α is small enough that the shift it produces on Mirror F is small enough that the beam stays on F even after multiples bounces. As in the case of the prism, the parallelogram has to be displaced from the plane of Auxiliary Mirror II in order to have an imaging condition. This displacement is calculated with as follows:

$$P_{2\_new\_position} = \begin{bmatrix} 1 & x & 0 \\ 0 & 1 & 0 \\ 0 & 0 & 1 \end{bmatrix} \begin{bmatrix} 1 & \dfrac{2d}{n} & 2d\left(\dfrac{1}{n}-1\right)\tan\alpha \\ 0 & 1 & n\tan\alpha \\ 0 & 0 & 1 \end{bmatrix} \quad (11)$$

As in Equation (8) the first matrix represents the displacement from the Auxiliary Mirror II plane, where x is the specific value that we are looking for.

Equation (11) simplifies as follows:

$$P_{2\_new\_position} = \begin{bmatrix} 1 & \dfrac{2d}{n}+x & 2d\left(\dfrac{1}{n}-1\right)\tan\alpha \\ 0 & 1 & n\tan\alpha \\ 0 & 0 & 1 \end{bmatrix} \quad (12)$$

According to element [1,2] of Equation (12), the new position of our parallelogram will be at x=−2d/n, from the original imaging plane of Auxiliary Mirror II.

Mirror and Lenses

Figure 6:
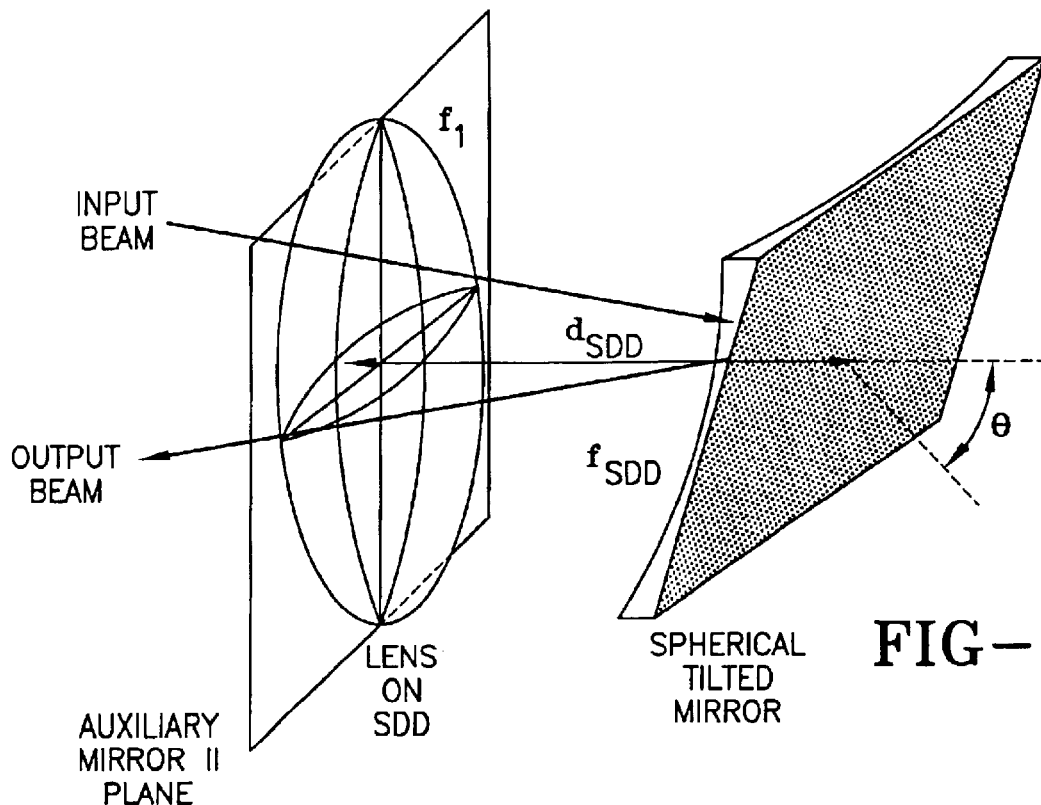
FIG. 6 shows substitution of X element by a lens and spherical mirror combination.

The prism and parallelogram can work under limited conditions, but there is a better way. Now let us consider a combination of a lens and a tilted spherical mirror as shown in FIG. 6. Here $d_{sdd}$ is the distance between the lens and the tilted spherical mirror, θ is the tilt angle of the spherical mirror, $f_{sdd}$ is the focal length of the mirror, and $f_l$ is the focal length of the lens.

Now let's assume that the lens is in the plane of Auxiliary Mirror II. The light travels through lens $f_l$, translates a distance $d_{sdd}$, is reflected by a tilted spherical mirror of a focal length $f_{sdd}$, and goes back the same way. The resulting matrix is:

$$SDD = \begin{bmatrix} 1 & 0 & 0 \\ -\dfrac{1}{f_l} & 1 & 0 \\ 0 & 0 & 1 \end{bmatrix} \begin{bmatrix} 1 & d_{sdd} & 0 \\ 0 & 1 & 0 \\ 0 & 0 & 1 \end{bmatrix} \begin{bmatrix} 1 & 0 & 0 \\ -\dfrac{1}{f_{sdd}} & 1 & 2\theta \\ 0 & 0 & 1 \end{bmatrix} \begin{bmatrix} 1 & d_{sdd} & 0 \\ 0 & 1 & 0 \\ 0 & 0 & 1 \end{bmatrix} \begin{bmatrix} 1 & 0 & 0 \\ -\dfrac{1}{f_l} & 1 & 0 \\ 0 & 0 & 1 \end{bmatrix} \quad (13)$$

If we take $f_l = d_{sdd}$ the matrix simplifies as follows:

$$SDD = \begin{bmatrix} -1 & \left(1-\dfrac{d_{sdd}}{f_{sdd}}\right)d_{sdd}+d_{sdd} & 2d_{sdd}\theta \\ 0 & 1 & 0 \\ 0 & 0 & 1 \end{bmatrix} \quad (14)$$

For imaging, element SDD[1,2] must be zero, making:
$f_{sdd}=d_{sdd}/2$.
Thus equation (14) simplifies to:

$$SDD = \begin{bmatrix} -1 & 0 & 2d_{sdd}\theta \\ 0 & -1 & 0 \\ 0 & 0 & 1 \end{bmatrix} \quad (15)$$

From Equation (15) we can see that lens-tilted mirror configuration has element [1,2] equal to zero, which indicates an imaging condition, and that the h element ([2,3]) is zero, which will not perturb the light imaging from Mirror E to Mirror F. From Equation (6), we recall that the shift produced in the spot pattern on the SLM is given by the negative of the g element ([1,3]), or $-2d_{sdd}\theta$ from Equation (15). For example, to shift a spot on the SLM by 1 cm with a $d_{sdd}$ of 2 cm, we require that the mirror can be tilted $-14°$.

Figure 7:
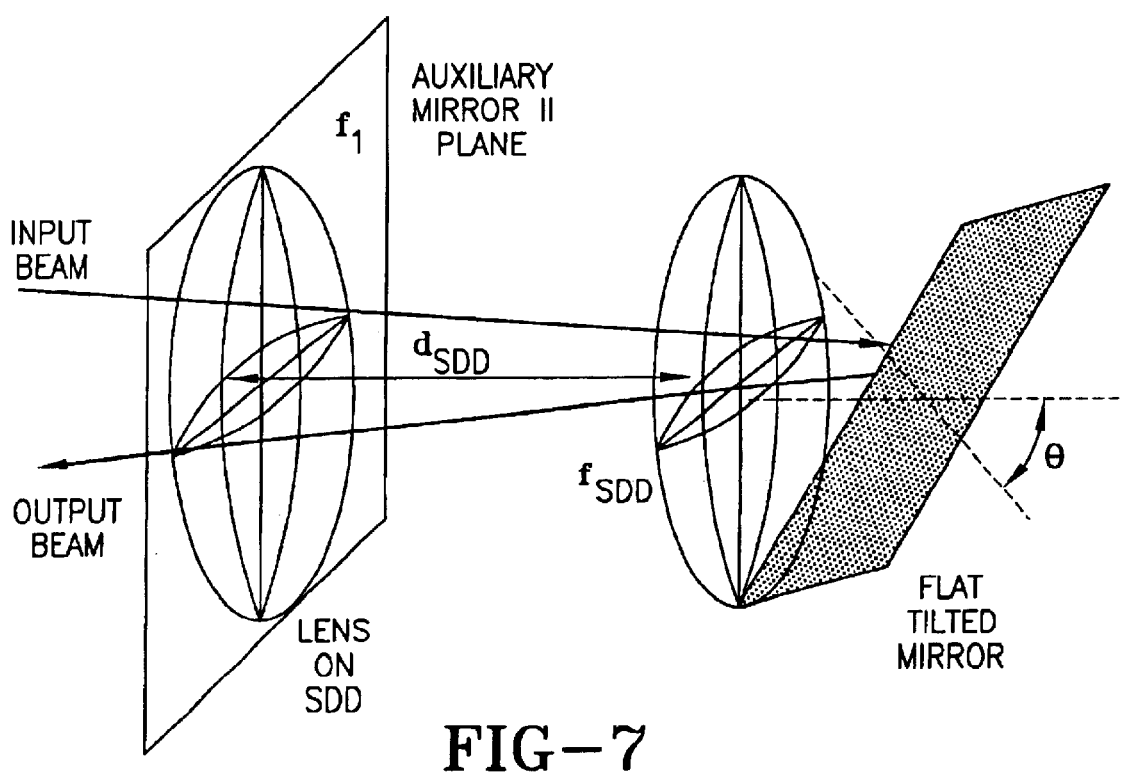
FIG. 7 shows substitution of X element by a lens and tilted mirror combination.
Figure 8:
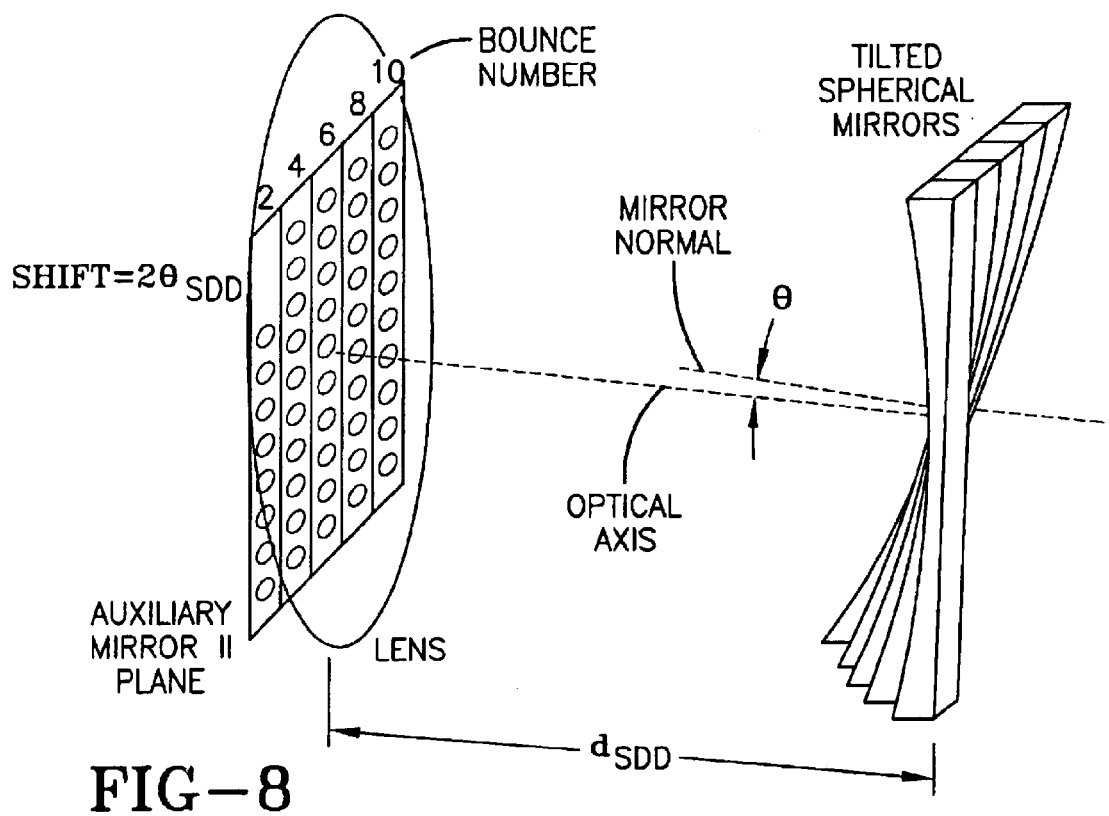
FIG. 8 shows a spot displacement device consisting of a lens; and an array of tilted spherical mirrors.

Instead of this combination of lens and a tilted spherical mirror we can substitute the tilted spherical mirror of FIG. 8 with a flat tilted mirror and a lens of same focal length as the tilted spherical mirror as shown in FIG. 7.

The ray matrix for this system is the same as Equation (15).

As was mentioned in the beginning of the addendum, each even-numbered column on Auxiliary Mirror II will have a different SDD. Each SDD produces a different shift, so each has its spherical mirror tilted by a different angle $\theta$, or is located at a different distance $d_{sdd}$ from the lens, or a combination. To keep the transit times equal, however, it is desirable to fix $d_{sdd}$ and vary $\theta$.

FIG. 8 shows one possible implementation of the proposed SDD. The lens is in the plane of Auxiliary Mirror II. The spots form in columns on this plane. Spots in the column labeled "2" should be shifted by one pixel in the SDD, spots in the column labeled "4" (for fourth bounce) should be shifted by two pixels, etc. Corresponding to each column is a spherical strip mirror. The overall mirror shape is a strip but the surface is spherically concave.

To make the transit time through the White Cell containing the SDD's the same as the transit time through the White Cell that contains Auxiliary Mirror I, the distances from the SLM to Auxiliary Mirror I and the plane of Auxiliary Mirror II can be made different from each other.

Figure 9:
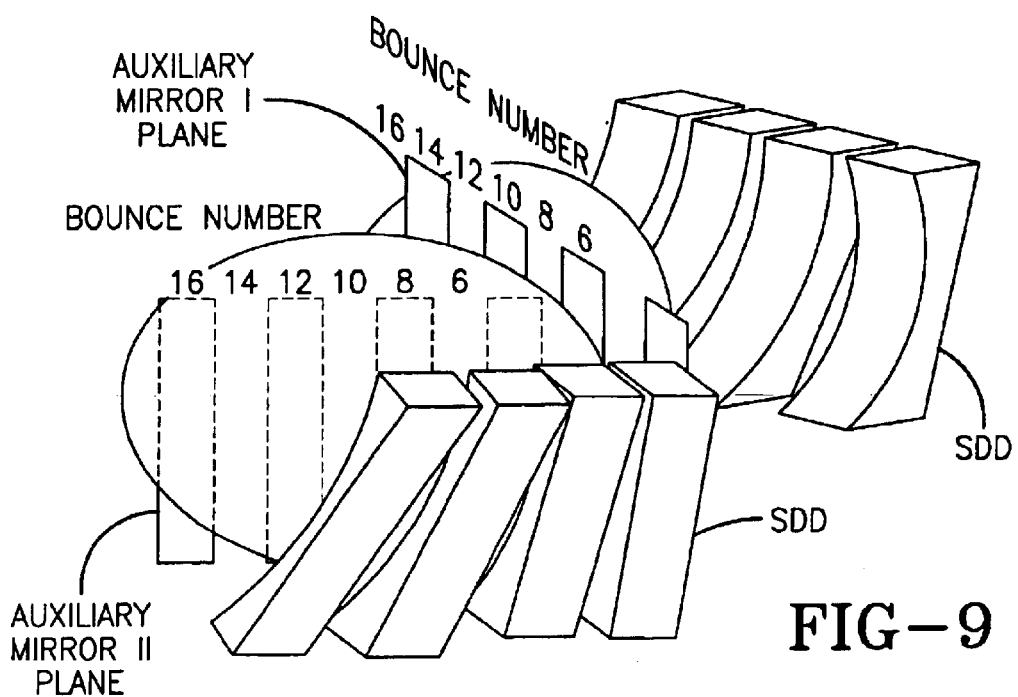
FIG. 9 illustrates the position of the SDDs in a double White cell.
Figure 10:
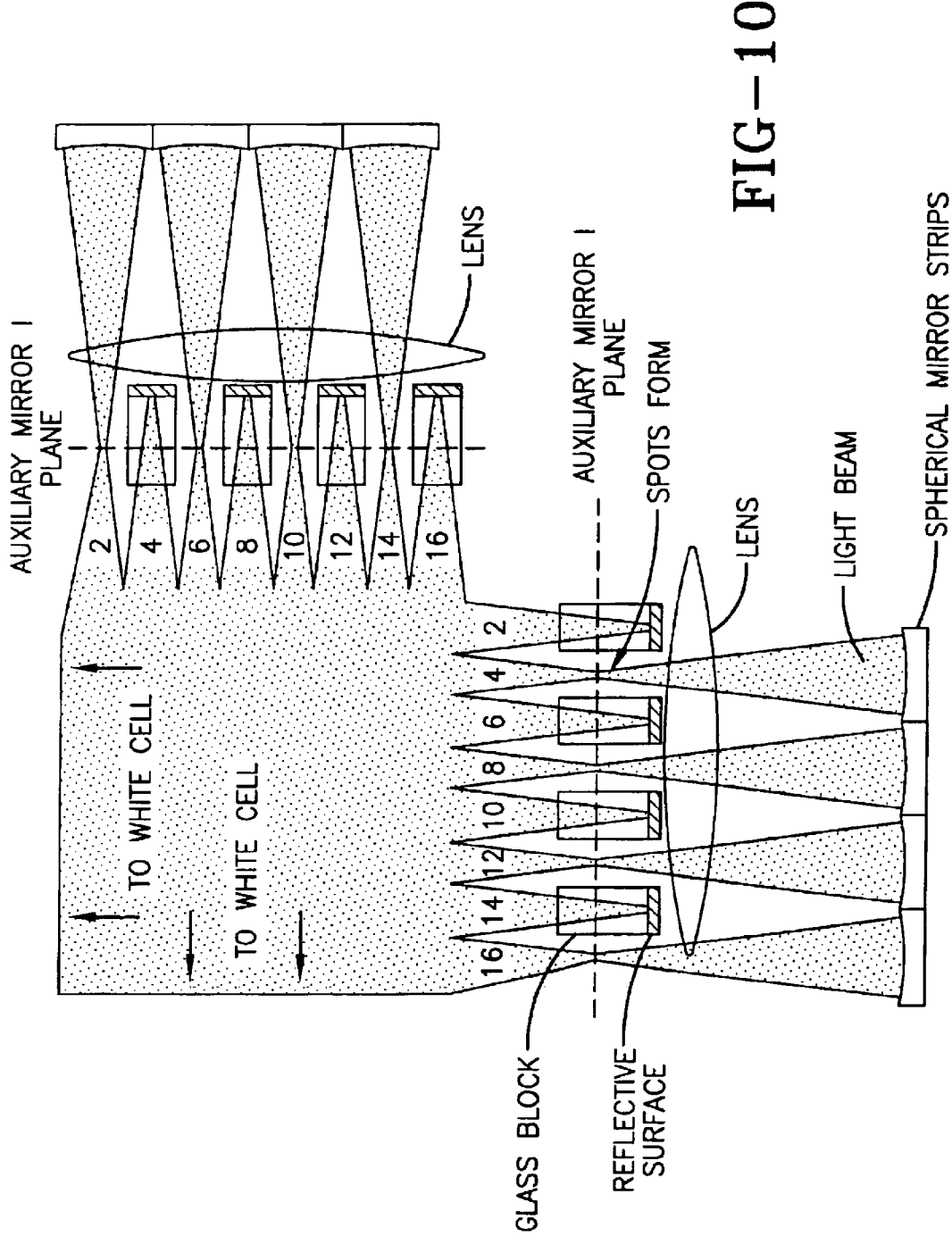
FIG. 10 shows how to alternate the SDDs with non-shifting mirrors, using glass blocks to equalize transit time.

One problem that we may face is that light from a spot in a particular column on the plane of Auxiliary Mirror II diverges inside the SDD and light may overlap with the spherical tilted mirror of an adjacent SDD. To reduce this risk, instead of putting all the SDDs in the plane of Auxiliary Mirror II. We may alternate SDDs between Auxiliary Mirror II and Auxiliary Mirror I. That is, alternate columns on each of the Auxiliary Mirrors are replaced with SDDs and the columns in between are simple flat mirrors, as shown in FIG. 9. So, for example, for an eight-bit space Optical Interconnection Device, columns 2, 6, 10 and 14 of Auxiliary Mirror I will be replaced with appropriate SDDs to produce the displacements corresponding to 1, 4, 16, 64 respectively. Columns 4, 8, 12 and 16 of Auxiliary Mirror I will have simple flat mirrors and will cause a displacement of 0. Similarly, for Auxiliary Mirror II, columns 2, 6, 10 and 14 will cause no displacement, and columns 4, 8, 12 and 16 will have SDDs producing shifts of 2, 8, 32 and 128 respectively For the design of FIG. 9, the transit times are no longer equal. They can be equalized, however, by replacing the flat mirrors with glass blocks, as shown in FIG. 10. The blocks are reflective on their backs. The higher refractive index of the blocks slows the light down, and also shifts the location of the image plane. Thus, the spots not being shifted are imaged to the mirror on the back of the blocks. The use of glass blocks to produce time delays is described in U.S. patent application Ser. No. 09/688,478.

SUMMARY OF BINARY CELL

We have shown how to implement an optical interconnection device that is binary—the number of outputs to which a given input can be shifted is given by $2^{m/2}$, where m is the number of bounces a beam makes in a dual White Cell. Half of the bounces land on a spatial light modulator and the other half are directed either to a spot displacement device or to a plain mirror. We assumed a liquid crystal spatial light modulator for the purposes of discussion, but the, SLM could in fact be any spatial light modulator. In the next section we will show how to obtain even greater numbers of outputs, using SLMs that have more than two states. An example of an SLM in this class would be a micro-electro-mechanical micromirror device, in which the individual mirrors can tip to more than two stable positions.

Higher Order Cells

In this section we will show how to obtain larger numbers of outputs using the basic idea behind the binary cell. We call this class of interconnection devices "exponential" because the number of outputs is given by some number to the power of the number of bounces, e.g. $N=2^{m/2}$.

Figure 11:
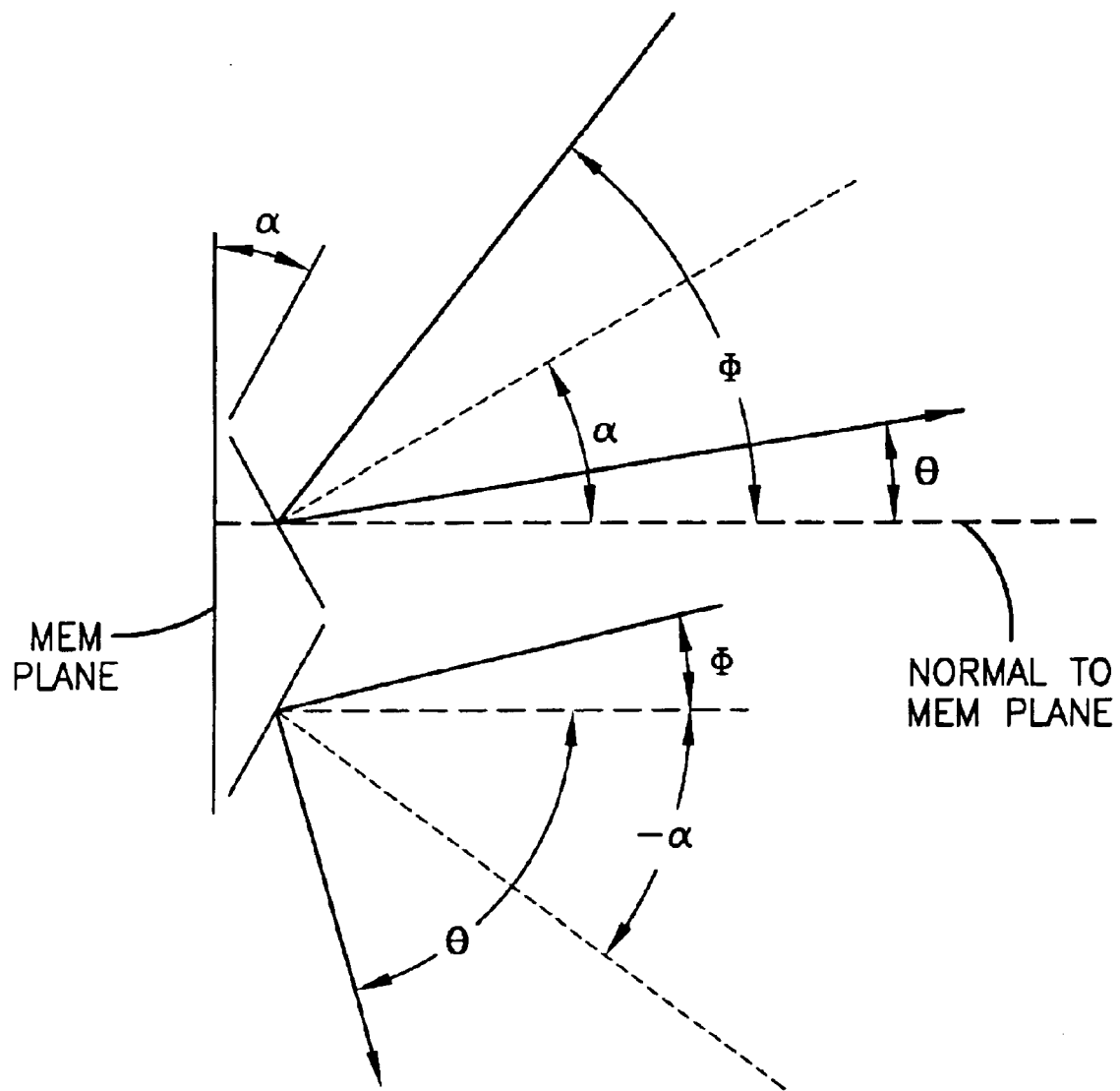
FIG. 11 shows a two-position MEM allowing for two output angles ($\theta$) for a given input angle ($\phi$).

Consider a micro-electro-mechanical machine (MEM) micromirror array whose mirrors can be rotated to two different angles. An example of such a device would be the Texas Instruments MEM, whose mirrors can be switched between $\pm 10°$. Let us take the angles of tilt to be $\pm\alpha$ for the general case. FIG. 11 shows a cross-sectional view of three pixels on such a device.

A light beam incident at some angle $\theta$ with respect to the normal to the MEM plane would be reflected into two possible angles:

$\theta=2\alpha-\phi$ or $\theta=-2\alpha-\phi$ \quad (16)

Figure 12:
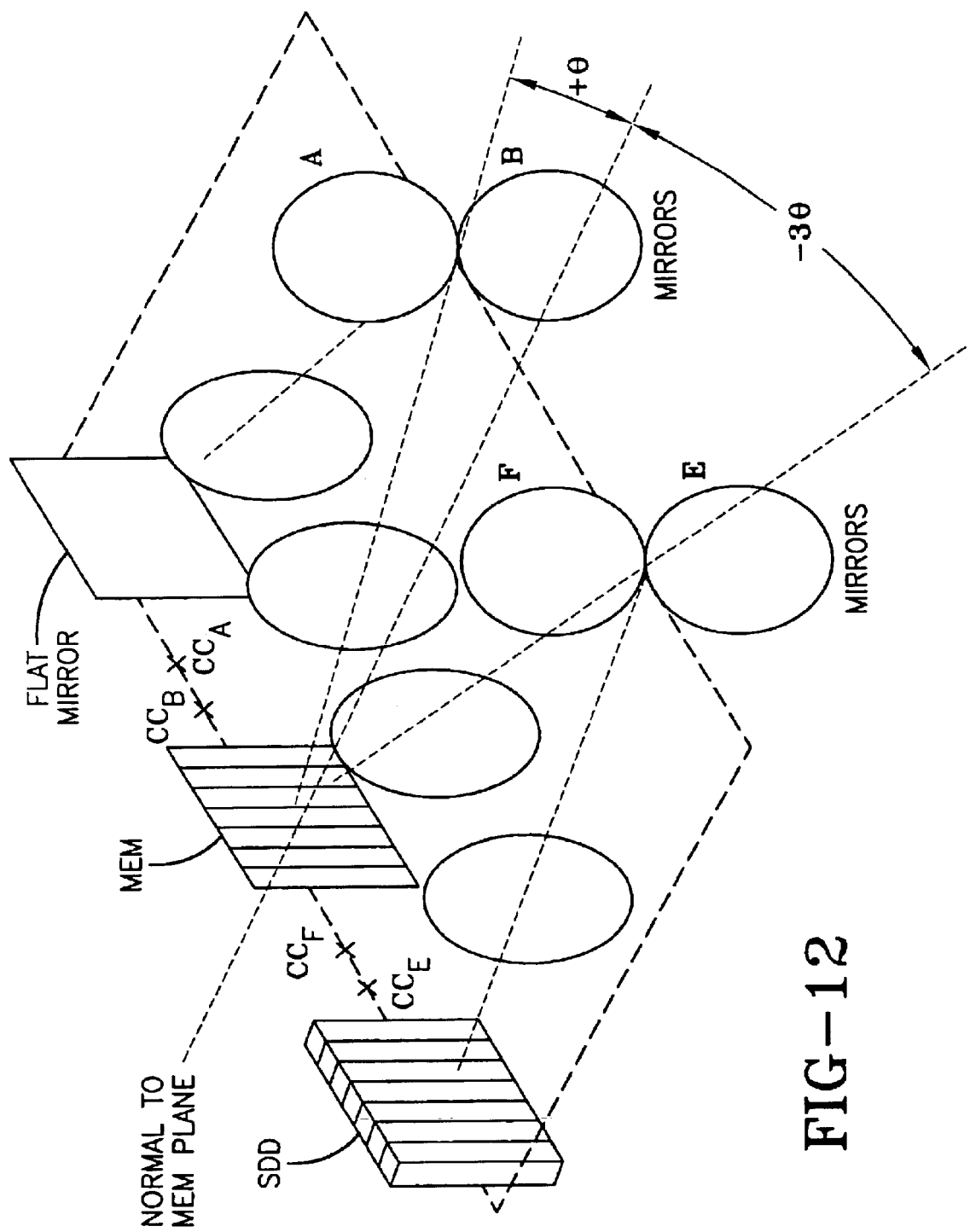
FIG. 12 shows a dual White cell using a two-position MEM, a spot displacement device and 4 spherical mirrors.

We can use these angles to set up a series of White Cells. For example, FIG. 12 shows two White Cells sharing a common MEM.

We note that light coming from Mirror A can be directed back toward Mirror B if the micro-mirror on the MEM is tilted at +10°. Thus, if every pixel is tilted at +10°, we could establish a White cell with both spherical mirrors (A and B) along the +10° path. This is shown in FIG. 12. Here, the spherical mirrors are located such that one is above the plane formed by the MEM normal and the $\pm 10°$ axes, and the other is below that plane. They could in principle be located side by: side, but it will be difficult to physically fit the mirrors that are to be described next.

Similarly, a second pair of spherical mirrors is established along the −30° axis. We call the two new White cell mirrors E and F. Their centers of curvature, along with those of Mirrors A and B, can be placed anywhere on the MEM plane. Thus these two White cells can create spot patterns in either rows or columns as desired. One White Cell is formed by the MEM, Mirror A, Auxiliary Mirror I, and Mirror B. The other is formed by the MEM, Mirror C, the SDD, and Mirror B. The MEM selects whether a beam would, on a given bounce, go to the auxiliary mirror and accrue no spot pattern shift, or go to the spot displacement device (SDD). In this device, two bounces are required on the MEM for each decision; so the maximum number of outputs N goes as $$N=2^{m/2}=(\sqrt{2})^m \qquad (17)$$

In operation a beam could circulate in the White cell formed by Mirrors A and B and the MEM, as long as each pixel is tilted in the +10° direction. If a given pixel is tilted to −10°, then the beam goes to Arm E if it just came from Mirror A, and goes to Arm F if it just came from Mirror B.

The beam must be input into the cell, however. Let the first MEM pixel be used to turn the input beam into the White cell containing Mirrors A and B (let's assume it goes to Mirror B). We bring the beams in along an angle of +50° (with respect to the MEM plane. The first pixel for each beam is set to +10°. Every beam makes this bounce and goes to Arm E. The appropriate column of the SDD is set for zero displacement, such that the normal spot pattern is produced. The next pixel each beam will hit is set to −10°. Thus the beams all go to Mirror B. From that point on, the beam alternates between upper and lower mirrors, and can be switched on any bounce such that they go to E and F, or to A and B. We now redefine m to be the number of bounces on the SLM, excluding the input and output bounces. Those bounces do not contribute to the number of outputs obtainable, although they will contribute to loss.

Note that light can bounce back and forth between Mirrors A and B, but if the light is sent to SDD E, in the other cell, it must return via Mirror F, and then to the SLM. Similarly, if light goes to Mirror F and SDD F, it must return via Mirror E. In either case, the light must return to the AB White Cell.

In the binary cell, we noted that every input beam would strike the same column on the MEM (or the Auxiliary Mirror or the entrance to the SDD which are images of the MEM) on a given bounce. Each column of the SDD could be associated with a different shift. In the binary cell, the shift produced by each column increased by a factor of two. Thus if the first column produced a shift of 1 pixel, then the next column produced a shift of 2, the next 4, etc.

Figure 13:
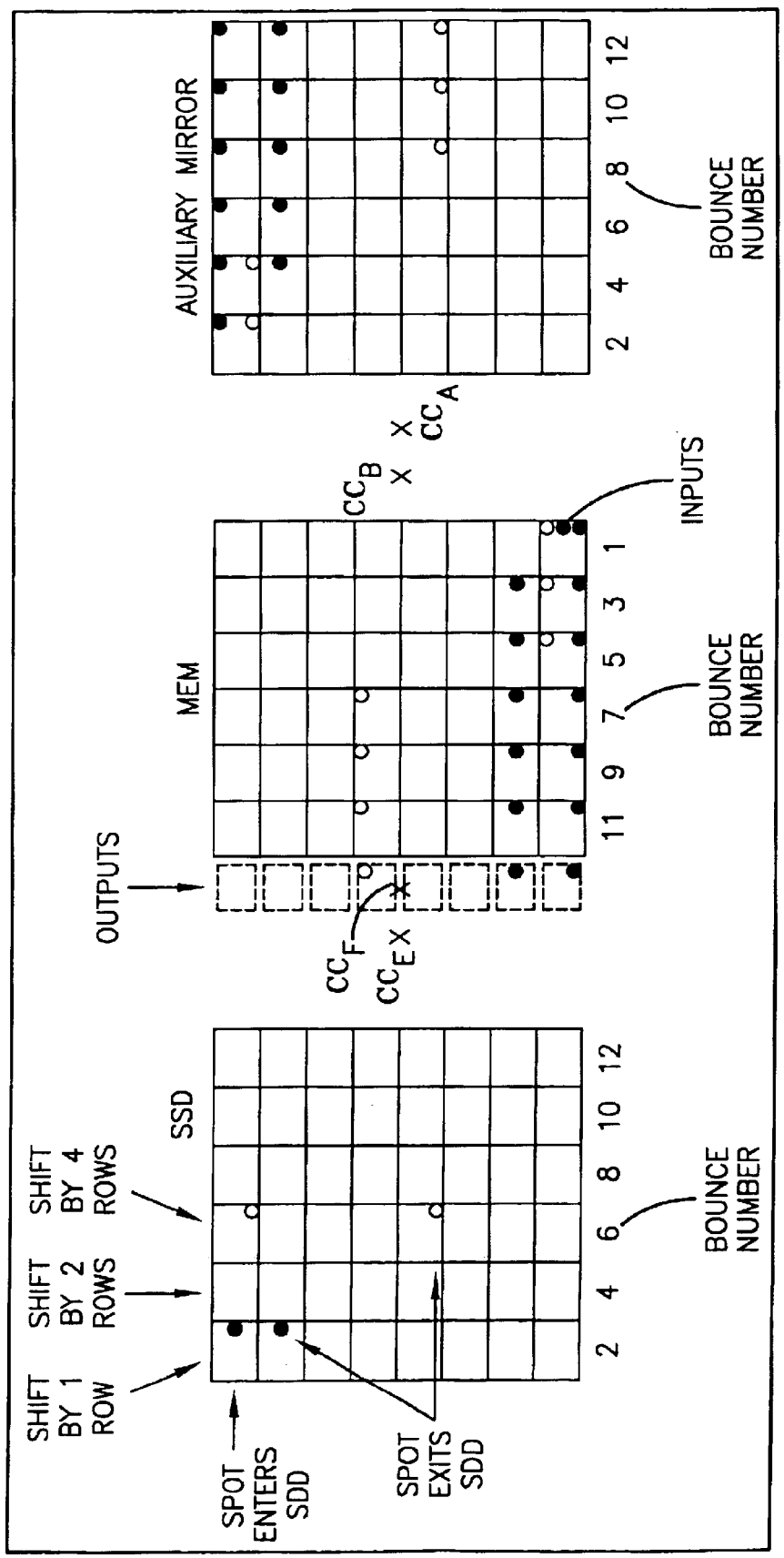
FIG. 13 illustrates the spot pattern for three different inputs in the dual White cell of FIG. 12.

FIG. 13 illustrates the spot progression for three different inputs. As can readily be seen, a given input can yield multiple output positions depending upon whether or not the light beam is sent to the SDD and to which column of the SDD the light beam is sent. For example, the light beam that bounces solely between the MEM and Auxiliary Mirror outputs at output 0 having not been shifted. The light beam sent to the SDD for its second bounce would receive a shift of one row and would output to output 1. And the light beam sent to the SDD for its sixth bounce receives a shift of 4 rows and outputs to output 4.

Figure 14:
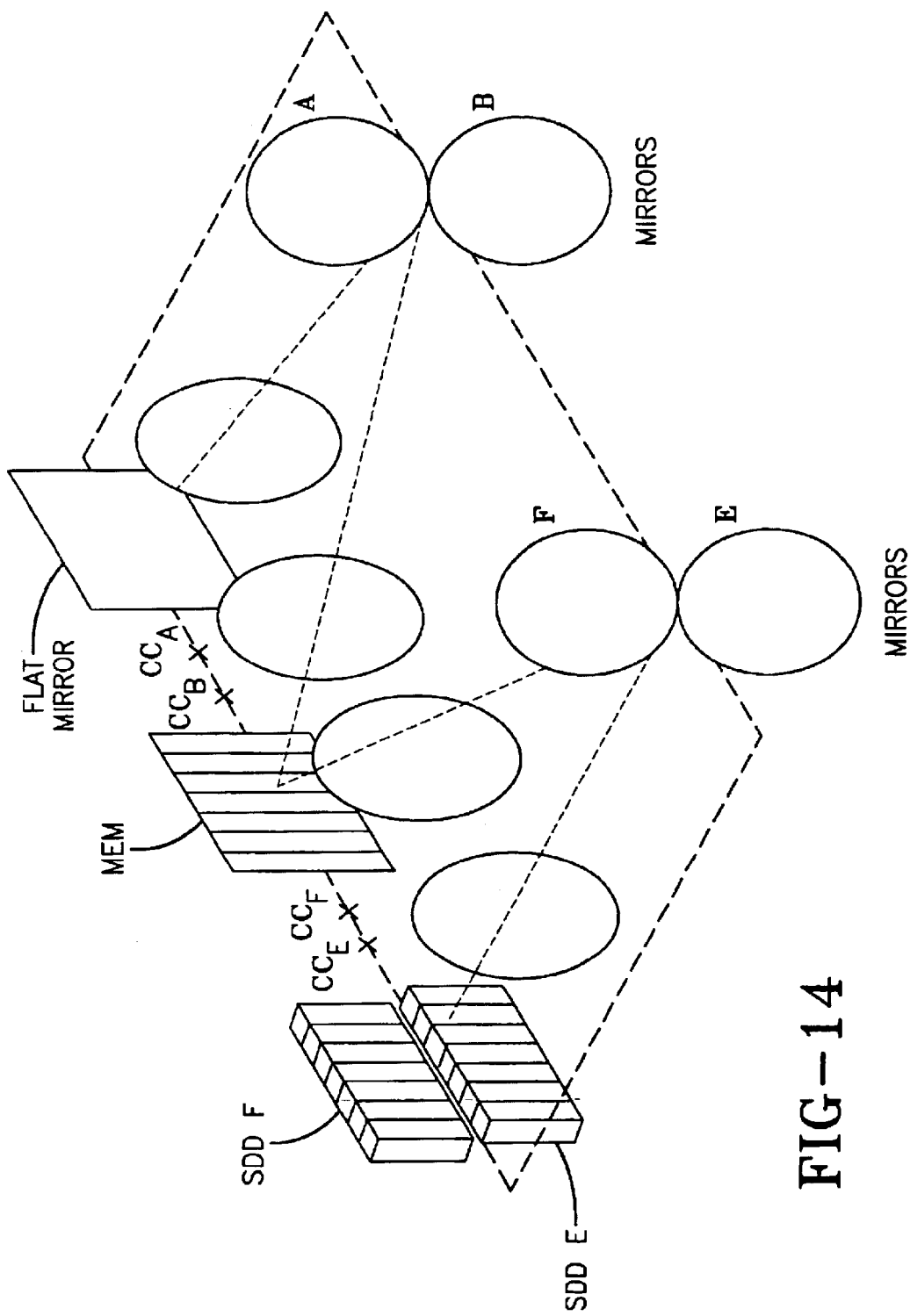
FIG. 14 shows the addition of a second SDD to the dual White cell illustrated in FIG. 12

We can construct higher-order devices as follows. We can place a first SDD such that light coming from Mirror E images the MEM plane onto the entrance of a spot displacement device (SDD E), and Mirror F images the MEM onto a different SDD plane (SDD F), as shown in FIG. 14. We associate each column of SDD E with the following shifts: 1, 3, 9, . . . $3^{(m/4-1)}$. Here, however, a "column" is two pixels (or four spots) wide. That is, if the beam goes to E on even bounces, it should be shifted whether it goes there on Bounce 2 or Bounce 4. For SDD F, we assign each column to a shift in the series 2, 6, 18, . . . $2 \cdot 3^{(m/4-1)}$ pixels.

The device operates as follows. If no net shift is desired, each MEM micro-mirror that the beam will strike is set to +10°. The beam constantly bounces back and forth between Mirrors A and B and the MEM. The spot pattern produced will result in a particular beam exiting the cell at output number 0. If output 1 is desired, then one must use the first column of SDD E to produce a shift of 1 pixel. This column can only be reached on an even-numbered bounce. Thus on the second bounce, the appropriate pixel on the MEM is switched to −10°. The light leaves the MEM at −30°. The beam is sent into the path to SDD E, column 1, and is shifted by one pixel by the SDD. The beam then returns to White Cell AB, and the third and fourth bounces are on the MEM. For a shift of two pixels, the beam must be sent to the first column of SDD F, which can only be reached on odd bounces. Thus on the first (or third) bounce the beam is directed to SDD F. Suppose it is the first. The first bounce is on SDD F, the second is on the MEM, the third and fourth are also on the MEM. In this scheme it requires four bounces to choose between spot pattern shifts of 0, 1 and 2 pixels.

On the next four bounces, one can get shifts of 3 and 6. Table 1 shows the choices of White cell arms that need to be visited for the first few outputs. We assume every beam starts a pair of bounces on an upper arm (Mirror A or Mirror F) and finishes a pair of bounces on a lower arm (Mirror B or Mirror E).

With four bounces (m=4) one can count up to 2, with m=8 one can count up to 8. The general formula for the maximum number of outputs using m bounces is $$N=3^{m/4}-1. \qquad (18)$$

We call this a ternary cell. It produces more shifts for a given number of bounces than a binary cell.

TABLE 1

Table of beam paths for the first few outputs, counting bounces in groups of four. The letters indicate the white cell arms visited on each bounce group. Each significant digit requires four bounces on the MEM.

| | Significance of digit | | |
|---|---|---|---|
| Output desired | Least | Next | Most |
| 0 | ABAB | | |
| 1 | AEAB | | |
| 2 | FBAB | | |
| 3 | ABAB | AEAB | |
| 4 (3 + 1) | AEAB | AEAB | |
| 5 (3 + 2) | FBAB | AEAB | |
| 6 | ABAB | FBAB | |
| 7 (6 + 1) | AEAB | FBAB | |
| 8 (6 + 2) | FBAB | FBAB | |
| 9 | ABAB | ABAB | AEAB |
| 10 (9 + 1) | AEAB | ABAB | AEAB |

From the present invention, it would thus be intuitive that if in any group of bounces, one plans to visit either E or F (or neither) that it would require only two bounces (i.e., FB or AE), and that the number of possible outputs ought to go as $3^{m/2}$. The flaw here is that if one chooses AE on a given pair of bounces, one cannot visit mirror F (path FB) on the next pair, because one cannot go from E directly to F. An illustrative example is for a shift of 7. To attempt a shift of seven, we would attempt to shift by one in a first set of bounces and then shift by six in a second set of bounces, noting that we are not permitting extra bounces. The progression would have to be AEFB, which is not possible under these conditions. The reason for choosing four bounces, then, was to guarantee one could end up at Mirror B at the end of each set of four bounces.

There is, however, a better way to achieve this. That is to count bounces in groups of three rather than four. If one assumes that one ended the previous group of bounces at Mirror B, one can go to Mirror A or SDD F on the first bounce of the next group, or Mirror B or SDD E on the second bounce (going to E assumes not having gone to F on the previous bounce) and end up at Mirror A on the third bounce regardless of the previous choices.

The next group of three bounces then goes to the bottom arms first On the first bounce, one can go to either B or E, and on the second bounce one can go to A or F (going to F assumes not having gone to E on the previous bounce), and in any case end up at B on the third bounce.

For this approach, the columns of the shift displacement device can be assigned as follows. We associate each column of SDD E with the following shifts: 1, 3, 9, ... $3^{(m/3)}$ pixels. For SDD F, we assign each column to a shift in the series: 2, 6, 18, ... $2\cdot 3^{(m/3)}$ pixels. Then the maximum number of outputs obtainable in m bounces off the MEM is $$N = 3^{m/3} - 1 \quad (19)$$

Table 2 shows how to shift a given input to any of the first few outputs using this approach.

TABLE 2

Table of beam paths for the first few outputs in the ternary cell, counting bounces in groups of three, using a two-state MEM.

| | Significance of digit | | |
|---|---|---|---|
| Output desired | Least | Next | Most |
| 0 | ABA | BAB | |
| 1 | AEA | BAB | |
| 2 | FBA | BAB | |
| 3 | ABA | EAB | |
| 4 (3 + 1) | AEA | EAB | |
| 5 (3 + 2) | FBA | EAB | |
| 6 | ABA | BFB | |
| 7 (6 + 1) | AEA | BFB | |
| 8 (6 + 2) | FBA | BFB | |
| 9 | ABA | BAB | AEA |
| 10 | AEA | BAB | AEA |

We note here that if the ternary cell is implemented using a liquid crystal SLM, then there is no requirement that one cannot go to E or F just after a visit to either one of those elements. In this case one can count bounces in pairs, and the number of outputs obtainable is:

$$N = 3^{m/2} - 1 \quad (19)$$

Next we explore the possibilities if the SLM has more than two states per pixel. Consider a hypothetical MEM whose mirrors can tilt to three different angles, for example +α, 0 and −α. A ray incident on such a MEM could be reflected at any of three angles:

$$\theta = 2\alpha - \phi \text{ (mirror at } +\alpha) \text{ or}$$
$$\theta = -\phi \text{ (mirror at 0) or}$$
$$\theta = -2\alpha - \phi \text{ (mirror at } -\alpha) \quad (20)$$

Table 3 shows some possible input angles and the resulting output angles. We pick a case in which $\pm\alpha = \pm 10$.

TABLE 3

The output angles for ray incident at various angles for the three-position MEM.

| Input angle | Output if pixel at +10° | Output if pixel at 0° | Output if pixel at −10° |
|---|---|---|---|
| 5° | 15° | −5° | −25° |
| 10° | 10° | −10° | −30° |
| 15° | 5° | −15° | −35° |
| 20° | 0° | −20° | −40° |

Figures 15, 16:
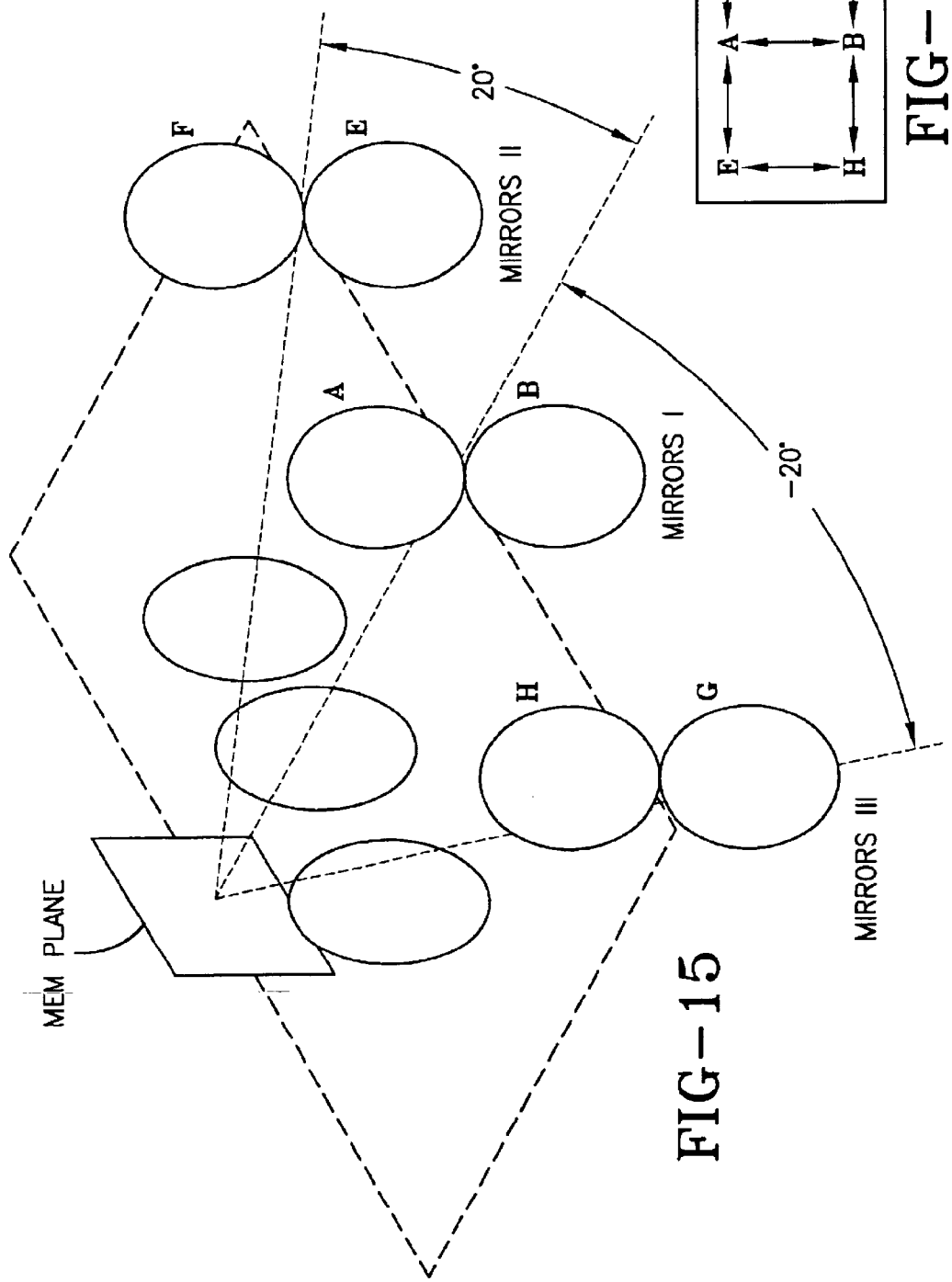
FIG. 15 shows a three-position MEM with three associated White cell arms.
FIG. 16 is a transition diagram for the device of FIG. 15.

Suppose for example, we construct three arms, call them I, II and III, whose axes are at +20°, −20° and 0° to the normal to the MEM plane, as shown in FIG. 15. We ask the following question: For a beam coming out of one of these arms, to which other arms can it be directed? Table 4 indicates the possibilities.

There are other possibilities for choices of White cell arm angles, as well, for example, +10°, −10° and −30°, but these are not as flexible, since one cannot reach as many different arms from a given arm as one can for the choices in Table 4.

TABLE 4

Possible transitions in the device of FIG. 15

| From | To (pixel +10°) | To (pixel 0°) | To (pixel −10°) |
|---|---|---|---|
| I | II | I | III |
| II | I | III | (−40°) |
| III | (+40°) | II | I |

We see from the table that beams can be directed in many directions; we chose to only use three for the next device. We observe that light from Arm I can be directed into either of the other two arms on any bounce. Arm II can go to Arm I or Arm III but not back into Arm II. Similarly, light coming from Arm III can go to II or I, but not back into III. FIG. 16 shows a transition diagram for the device of FIG. 15.

Figure 17:
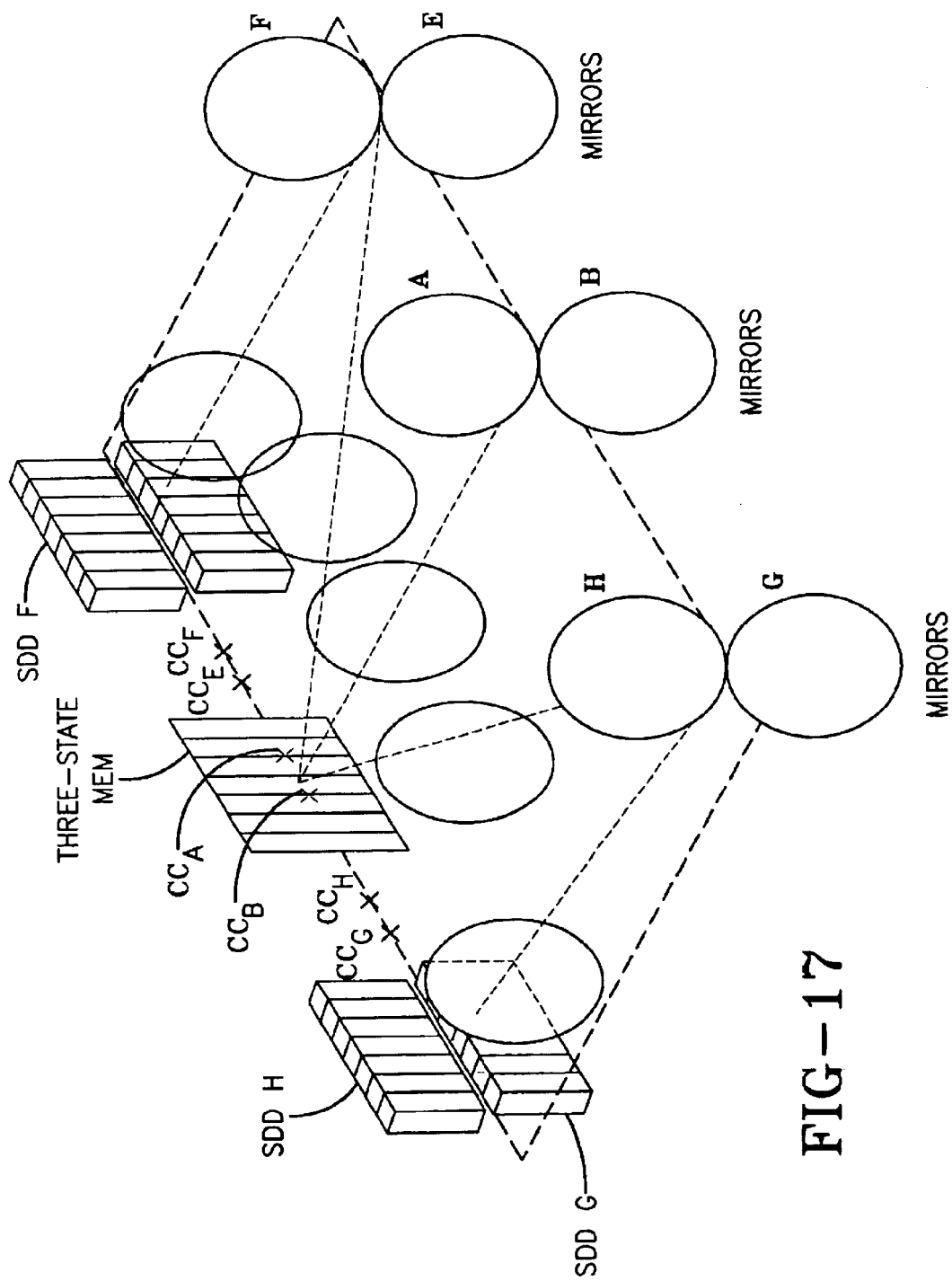
FIG. 17 shows a three-position MEM, with three arms and four shift devices added.

We now add four SDDs, as shown in FIG. 17. We again count bounces in groups of four to ensure that we finish up a group of bounces at Mirror B, from which we can then go to any upper path to begin the next set of bounces. Now the shifts produced by each SDD are, column by column, those shown in Table 5.

TABLE 5

Assignment of shifts for the indicated columns of each spot displacement device in FIG. 17.

| Arm | Shift in Column 1 | Shift in Column 2 | Shift in Column 3 | Shift in Column L |
|---|---|---|---|---|
| E | 1 pixel | 5 pixels | 25 pixels | $5^{(\frac{m}{4}-1)}$ |
| F | 2 pixels | 10 pixels | 50 pixels | $2 \times 5^{(\frac{m}{4}-1)}$ |
| G | 3 pixels | 15 pixels | 75 pixels | $3 \times 5^{(\frac{m}{4}-1)}$ |
| H | 4 pixels | 20 pixels | 100 pixels | $4 \times 5^{(\frac{m}{4}-1)}$ |

We also note that beam going from one of the upper White Cell arms (A, F and H) can only go to a lower one (B, E and G). The reverse is also true. Table 6 illustrates the paths required for various outputs using the scheme of FIG. 17.

TABLE 6

Mirror combinations to shift a given input to the indicated output, for the design of FIG. 17.

| | Significance of digit | | |
|---|---|---|---|
| Output desired | Least | Next | Most |
| 0 | ABAB | | |
| 1 | AEAB | | |
| 2 | FBAB | | |
| 3 | AGAB | | |
| 4 (3 + 1) | HBAB | | |
| 5 (3 + 2) | ABAB | AEAB | |
| 6 | AEAB | AEAB | |
| 7 (6 + 1) | FBAB | AEAB | |
| 10 | ABAB | FBAB | |
| 24 (20 + 4) | HBAB | HBAB | |
| 25 | ABAB | ABAB | AEAB |
| 124 (100 + 20 + 4) | HBAB | HBAB | HBAB |

The maximum number of outputs achievable with this device is, counting with the method of Table 6, would seem to be $$N_{apparent}=5^{m/4}-1 \tag{21}$$

This number would be obtained by visiting only the two paths H and B. One would be adding 4+20+100+ . . . . For twelve bounces, one could count up to 124, in agreement with Equation (21). In practice however, one can go slightly higher. One can visit Mirrors H and E in two successive bounces since one is an upper and one is a lower mirror and they are not in the same White cell. Thus, one can obtain, in twelve bounces, 125 by using HBAB HBAB HEAB (100+ 20+(4+1)). One cannot count to 126 without additional bounces. Thus the actual maximum number of outputs is, in fact, $$N=5^{m/4} \tag{22}$$

We notice a waste of bounces in Table 6, however. Every group of four bounces ends in the combination AB, which happens because one needs to end up at Mirror B in order to assure that one can go to any upper mirror at the beginning of the next group. We must end up at B, but not necessarily via A on the third bounce to get to B on the fourth bounce.

If we assign Column 1 to a shift of 1 pixel in SDD E, and assign Column 1 to a shift of 2 pixels in SDD H (in a different arm than mirror E), then a single group of four bounces, we can obtain shifts of 0 (ABAB), 1 (AEAB), 2 (HBAB), 3 (HEAB), 4 (HBHB), and 5 (HEHB), and still end up at B as required. One can assign Column 1 of one of the remaining SDD's (say, 6) to a shift of six, and the last SDD's first column to 7. Thus we assign the lengths as shown in Table 7. Table 8 shows how to count up to 63 outputs in 8 bounces.

TABLE 7

An alternative way of assigning the shifts produced by the SDD's in FIG. 17.

| Arm | Least significant bounce | More significant bounce | General case |
|---|---|---|---|
| A | 0 | 0 | 0 | 0 |
| B | 0 | 0 | 0 | 0 |
| E | 1 | 8 | 64 | $8^{(\frac{m}{4}-1)}$ |
| F | 7 | 56 | 488 | $7 \times [8^{(\frac{m}{4}-1)}]$ |
| G | 6 | 48 | 384 | $6 \times [8^{(\frac{m}{4}-1)}]$ |
| H | 2 | 16 | 128 | $2 \times [8^{(\frac{m}{4}-1)}]$ |

The maximum number of outputs obtainable in this case is $$N=8^{(m/4)}-1 \tag{23}$$

One can apply the principle of counting in groups of odd numbers of bounces to improve on this result. We will try counting bounces in groups of five. We assign the shifts in each column of the various shift displacement devices as shown in Table 9, and Table 10 shows how to obtain the first few outputs.

TABLE 8

The bounce patterns to divert an input to various outputs using the shift assignments on Table 7.

| Desired output | First group of four bounces | Second group of four bounces | Third group of four bounces |
|---|---|---|---|
| 0 | ABAB | | |
| 1 | AEAB | | |
| 2 | HBAB | | |
| 3 | HEAB | | |
| 4 | HBHB | | |
| 5 | HEHB | | |
| 6 | AGAB | | |
| 7 | FBAB | | |
| 8 | ABAB | AEAB | |
| 13 (8 + 5) | HEHB | AEAB | |
| 40 | ABAB | HEHB | |
| 63 (56 + 7) | HEHB | HEHB | |
| 64 | ABAB | ABAB | AEAB |

TABLE 9

Assignment of shifts for the indicated columns in each SDD for the system counting bounces in groups of five for the device of FIG. 17.

| Arm | Shift in Column 1 | Shift in Column 2 | Shift in Column 3 | Shift in Column L |
|---|---|---|---|---|
| E | 1 | 16 | 256 | $16^{(\frac{m}{5}-1)}$ |
| F | 9 | 144 | 2304 | $9 \times 16^{(\frac{m}{5}-1)}$ |
| G | 11 | 176 | 2 | $11 \times 16^{(\frac{m}{5}-1)}$ |
| H | 3 | 48 | 768 | $3 \times 16^{(\frac{m}{5}-1)}$ |

TABLE 10

The bounce patterns to reach outputs using the assignments in Table 9.

| Output desired | First group of five bounces | Second group of five bounces |
|---|---|---|
| 0 | ABABA | |
| 1 | AEABA | |
| 2 | AEAEA | |
| 3 | HBABA | |
| 4 | HBAEA | |
| 5 | HEAEA | |
| 6 | HBHBA | |
| 7 | HEHBA | |
| 8 | HEHEA | |
| 9 | FBABA | |
| 10 (9 + 1) | FBAEA | |
| 11 | AGABA | |
| 12 | AGAEA | |
| 13 (9 + 3 + 1) | FBHEA | |
| 14 (11 + 3) | AGFBA | |
| 15 (11 + 4) | AGHEA | |
| 16 | ABABA | EBABA |
| 17 (16 + 1) | AEABA | EBABA |

In this case the number of outputs obtainable in m bounces is $$N=16^{m/5}-1 \tag{24}$$

We can compare this to the performance of the device of Table 8. We ask, for a given m, which is larger, the expression in Equation (23) or the expression in Equation (24)? We are asking the question, which is larger, $8^{m/4}$ or $16^{m/5}$! Taking the log of both sides gives m/4log(8) less than or greater than m/5log(16)? m/4(0.903) less than or greater than m/5(1.2)? 0.225<0.240.

Therefore, the 5-bounce system produces more outputs.

Figure 18:
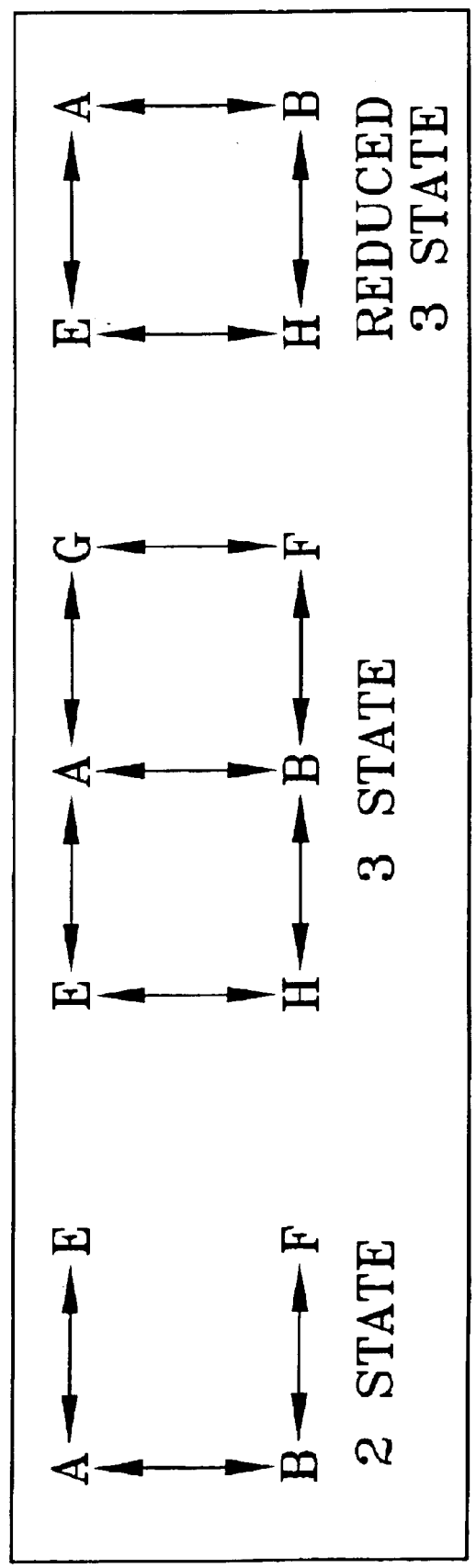
FIG. 18 provides a comparison of the connectivity of cells based on two-state MEMs and three-state MEMs.
Figure 19:
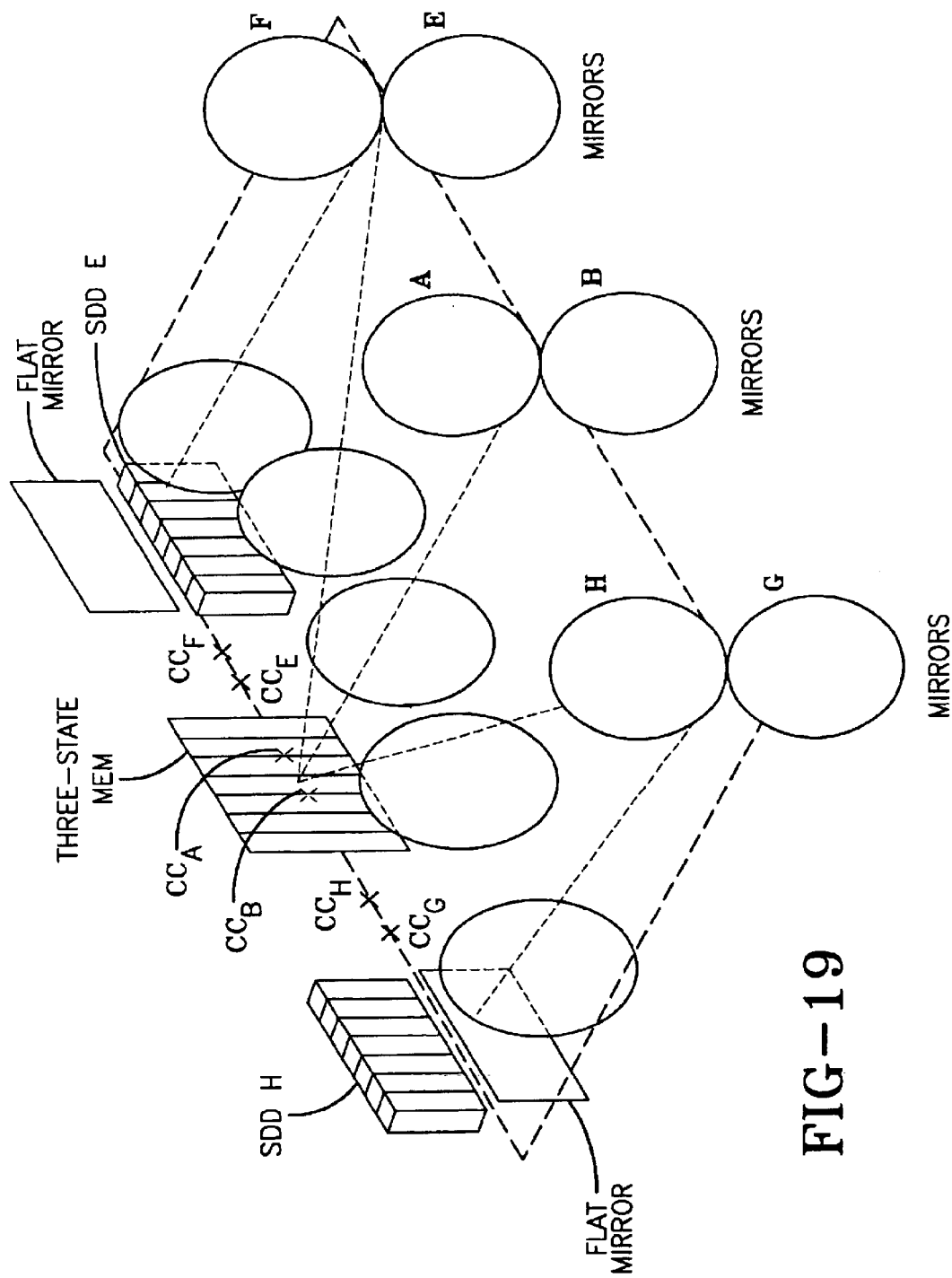
FIG. 19 shows an interconnection device using a three-state MEM but only two SDDs.

We can improve on this even further. We recognize that the three-state MEM has not only more positions, but increased connectivity over a two-state MEM. FIG. 18 provides a comparison of the connection diagram for the device of FIG. 14 (two-state) and the device of FIG. 18. The connection diagram is an open loop for the two-state case, requiring additional bounces to go from E to F. In the three state case, two complete loops exist. Thus, one can simply eliminate two of the SDD's and have the situation in FIG. 19.

Table 11 shows one way to assign the displacements of each column of the two spot displacement devices. Using this approach, the number of outputs that can be reached in m bounces is $$N = 4^{m/2} - 1 \quad (25)$$

We call this the quaternary cell.

TABLE 11

Assignments of displacements far improved ternary cell

| Arm | Shift in Column 1 | Shift in Column 2 | Shift in Column 3 | Shift in Column L |
|---|---|---|---|---|
| E | 1 | 4 | 16 | $4^{(m/2-1)}$ |
| H | 2 | 8 | 32 | $2 \cdot 4^{(m/2-1)}$ |

Four and Higher State MEM's

Table 12 shows the mirror progressions in this case.

TABLE 12

Bounce patterns for the quaternary cell based on a three-position DMD.

| Output desired | First pair of bounces | Second pair of bounces | Third pair of bounces |
|---|---|---|---|
| 0 | AB | AB | AB |
| 1 | AE | AB | AB |
| 2 | HB | AB | AB |
| 3 | HE | AB | AB |
| 4 | AB | AE | AB |
| 5 (1 + 4) | AE | AE | AB |
| 6 (2 + 4) | HB | AE | AB |
| 7 (3 + 4) | HE | AB | AB |
| 8 | AB | HB | AB |

TABLE 12-continued

Bounce patterns for the quaternary cell based on a three-position DMD.

| Output desired | First pair of bounces | Second pair of bounces | Third pair of bounces |
|---|---|---|---|
| 9 (1 + 8) | AE | HB | AB |
| 10 (2 + 8) | HB | HB | AB |
| 11 (3 + 8) | HE | HB | AB |
| 12 (4 + 8) | AB | HE | AB |
| 13 (1 + 12) | AE | HE | AB |
| 14 (2 + 12) | HB | HE | AB |
| 15 (3 + 12) | HE | HE | AB |
| 16 | AB | AB | AE |

Conclusions

We have discussed several solutions for a binary and higher order exponential optical interconnection device. A binary interconnection device will allow us to have $2^{m/2}$ outputs for a single input. Here m is the number of bounces that a light beam in the dual White cell, excluding any extra bounces needed for input and output. This is an improvement to previous designs where the number of outputs were of the order of $m^1$, $m^2$, etc. Let us compare the exponential cells to the polynomial cells.

Using a two-state MEM in a quadratic cell, the number of outputs obtainable would be $N=(m/4)^2+3(m/3)=40$ outputs (2-state MEM, quadratic cell)

Table 13 compares the number of outputs attainable for a given number of bounces for the various designs.

We presented a general solution for a Spot Displacement Device (SDD) using simple paraxial ray matrices. The SDD should have certain characteristics that allow it to produce the required spot shifts on the SLM plane while maintaining the imaging conditions of the dual White Cell.

We found three solutions for our SDD. The first one is a prism of apex α that has to be displaced −2d/n from the original plane of Auxiliary mirror II, and has a final displacement on the original SLM spot position of −2d(1/n−1)tan(α). The second solution is a parallelogram that has to be displaced −2d/n from the original plane of Auxiliary Mirror II, and produces a final displacement of −2d(1/n−1)tan(α). One condition for the parallelogram is that the apex α has to be close to zero. Our third solution was an SDD formed by the combination of a lens and a tilted spherical mirror that displaces a spot on the SLM by −2dθ.

TABLE 13

Comparison of the capabilities of the various designs presented in this disclosure and previous disclosures.

| Type of interconnection cell | Type of SLM | Equation | Number of outputs that can be reached in twenty bounces |
|---|---|---|---|
| Polynomial: quadratic | Liquid crystal | $N = \left(\frac{m}{2}\right)^2 + m$ | 120 |
| Polynomial: quadratic | Two-state MEM | $N = \left(\frac{m}{4}\right)^2 + 3\left(\frac{m}{4}\right)$ | 40 |
| Polynomial: quartic | Three-state MEM | $N = \left[\left(\frac{m}{4}\right)^4 + 4\left(\frac{m}{4}\right)^3 + 6\left(\frac{m}{4}\right)^2 + 4\left(\frac{m}{4}\right) - 1\right]$ | 1,294 |

TABLE 13-continued

Comparison of the capabilities of the various designs presented in this disclosure and previous disclosures.

| Type of interconnection cell | Type of SLM | Equation | Number of outputs that can be reached in twenty bounces |
|---|---|---|---|
| Exponential, binary | Liquid crystal | $N = 2^{\frac{m}{2}}$ | 1,024 |
| Exponential, binary | Two-state MEM | $N = 2^{\frac{m}{4}}$ | 512 |
| Exponential, ternary | Two-state MEM | $N = 3^{m/3} - 1$ | 729 (18 bounces) 2,187 (21 bounces) |
| "16-ary" | Three-state SLM | $N = 16^{m/5} - 1$ | 65,536 |
| Quartenary | Three-state MEM | $N = 4^{m/2} - 1$ | 1,048,575 |

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims, which are incorporated herein by reference.

What is claimed is:

1. An optical interconnection device comprising:
at least one input light source, each said input light source adapted to introduce at least one individual light beam;
a first optical configuration, said first optical configuration comprising a first plurality of optical elements so as to define a plurality of possible light paths for each said individual light beam, said first optical configuration adapted to receive each said individual light beam emerging from each said input light source, said first optical configuration further adapted to direct a said light beam to a spatial light modulator;
a second optical configuration, said second optical configuration comprising a second plurality of optical elements configured so as to define a plurality of possible light paths for each said individual light beam, said second optical configuration further comprising at least one spot displacement device, said second optical configuration adapted to receive as input a said individual light beam reflected from said spatial light modulator, said second optical configuration further adapted to direct a said individual light beam to said spatial light modulator; and
said spatial light modulator comprising at least one column, each said column comprising at least two rows, said spatial light modulator adapted to select a given path from said plurality of possible light paths for a light beam, wherein said spot displacement device is operable for shifting a said individual light beam on said spatial light modulator by at least one row.

2. An optical interconnection device according to claim 1 wherein each said individual light beam traverses said optical interconnection device in a similar period of time as all other light beams.

3. An optical interconnection device according to claim 1 wherein a said individual light beam is directed to an output by said first optical configuration.

4. An optical interconnection device according to claim 1 wherein a said individual light beam is directed to an output by said second optical configuration.

5. An optical interconnection device according to claim 1 wherein a said individual light beam is directed to an output by said spatial light modulator.

6. An optical Interconnection device according to claim 1 wherein said first optical configuration additionally comprises at least one spot displacement device.

7. An optical interconnection device according to claim 1 wherein said first plurality of optical elements comprises at least one optical element selected from the group consisting of mirrors, lenses, gratings, and prisms.

8. An optical interconnection device according to claim 1 wherein said second plurality of optical elements comprises at least one optical element selected from the group consisting of mirrors, lenses, gratings, and prisms.

9. An optical interconnection device according to claim 1 wherein each said spot displacement device comprises at least one column, each said spot displacement device being operable for shifting a said individual light beam by at least one row on said spot displacement device and thus on said spatial light modulator, each additional column of said spot displacement device operable for displacing said individual light beam by at least twice the displacement of the previous column.

10. An optical interconnection device according to claim 1 wherein each said spatial light modulator is selected from the group consisting of: liquid crystal spatial light modulators, two-state micro-electro-mechanical machine devices, and three-state micro-electro-mechanical machine devices.

11. An optical interconnection device comprising:
at least one input light source, each said input light source adapted to introduce at least one individual light beam;
a first optical configuration, said first optical configuration comprising a first plurality of optical elements so as to define a plurality of possible light paths for each said individual light beam, said first optical configuration further comprising at least one spot displacement device, said first optical configuration adapted to receive each said individual light beam emerging from each said input light source, said first optical configuration further adapted to direct a said individual light beam to a spatial light modulator;
a second optical configuration, said second optical configuration comprising a second plurality of optical elements configured so as to define a plurality of possible light paths for each said individual light beam, said second optical configuration adapted to receive as input a said individual light beam reflected from said spatial light modulator, said second optical configuration further adapted to direct a said individual light beam to said spatial light modulator; and said spatial light modulator comprising at least one column, each said column comprising at least two rows, said spatial light modulator adapted to select a given path from said plurality of possible light paths for a light beam, wherein said spot displacement device is operable for shifting a said individual light beam on said spatial light modulator by at least one row.

12. An optical interconnection device according to claim 11 wherein each said individual light beam traverses said optical interconnection device in a similar time period as all other light beams.

13. An optical interconnection device according to claim 11 wherein a said individual light beam is directed to an output by said first optical configuration.

14. An optical interconnection device according to claim 11 wherein a said individual light beam is directed to an output by said second optical configuration.

15. An optical Interconnection device according to claim 11 wherein a said individual light beam is directed to an output by said spatial light modulator.

16. An optical interconnection device according to claim 11 wherein said second optical configuration additionally comprises at least one spot displacement device.

17. An optical interconnection device according to claim 11 wherein said first plurality of optical elements comprises at least one optical element selected from the group consisting of mirrors, lenses, gratings, and prisms.

18. An optical interconnection device according to claim 11 wherein said second plurality of optical elements comprises at least one optical element selected from the group consisting of mirrors, lenses, gratings, and prisms.

19. An optical interconnection device according to claim 11 wherein each said spot displacement device comprises at least one column, each said spot displacement device being operable for shifting a said individual light beam by at least one row on said spot displacement device and thus on said spatial light modulator, each additional column of said spot displacement device operable for displacing said light beam by at least twice the displacement of the previous column.

20. An optical interconnection device according to claim 11 wherein each said spatial light modulator is selected from the group consisting of: liquid crystal spatial light modulators, two-state micro-electro-mechanical machine devices, and three-state micro-electro-mechanical machine devices.

* * * * *

UNITED STATES PATENT AND TRADEMARK OFFICE
CERTIFICATE OF CORRECTION

PATENT NO. : 6,760,140 B1  
APPLICATION NO. : 10/086355  
DATED : July 6, 2004  
INVENTOR(S) : Argueta-Diaz et al.

It is certified that error appears in the above-identified patent and that said Letters Patent is hereby corrected as shown below:

In Item (56), please add -- OTHER PUBLICATIONS

HECT, Jeff, Many Approaches Taken for All-Optical Switching, Laser Focus World, www.optoelectronics-world.com, August, 2001, 5 pp.

FAIRLEY, Peter, The Microphotonics Revolution, Mit's Magazine of Innovation, Technology Review, July/August, 2000, pp. 38-44.

ZDEBLICK, Mark, Design Variables Prevent a Single Industry Standard, Laser Focus World, www.optoelectronics-world.com, March, 2001, pp. 139-144.

BISHOP, David et al., The Rise of Optical Switching, Scientific American, January, 2001, 88-94. --

In column 1, line 41, please delete "Coming" and insert -- Corning --.

In column 1, line 61, please delete "family," and insert -- family --.

In column 3, line 62, please delete "device," and insert -- device --.

In column 4, line 25, please delete "lens;" and insert -- lens --.

In column 5, line 10, please delete "lights" and insert -- light --.

In column 5, line 39, please delete "Mirror 11" and insert -- Mirror II --.

In column 6, line 65, please delete "Mirror II" and insert -- Mirror I --.

In column 7, line 2, please delete "and-Mirror" and insert -- and Mirror --.

In column 7, line 29, please delete "Mirror. II" and insert -- Mirror II --.

In column 7, line 33, please delete "$C_3[1,2]=d_3^2c$" and insert -- $C_3[1,2]= d_3^2 c$ --.

In column 10, line 42, please delete "$f_l$" and insert -- $f_1$ --.

In column 10, line 46, please delete "$f_l$" and insert -- $f_1$ --.

UNITED STATES PATENT AND TRADEMARK OFFICE
CERTIFICATE OF CORRECTION

PATENT NO.      : 6,760,140 B1
APPLICATION NO. : 10/086355
DATED           : July 6, 2004
INVENTOR(S)     : Argueta-Diaz et al.

It is certified that error appears in the above-identified patent and that said Letters Patent is hereby corrected as shown below:

In column 10, line 59, please delete "$f_1 = d_{sdd}$" and insert -- $f_1 = d_{sdd}$ --.

In column 11, lines 19-20, please delete "FIG. 8" and insert -- FIG. 6 --.

In column 12, line 14, please delete "the, SLM" and insert -- the SLM --.

In column 12, line 53, please delete "by: side," and insert -- by side, --.

In column 14, line 24, please delete "white" and insert -- White --.

In column 14, line 64, please delete "first On" and insert -- first. On --.

In column 15, line 47, please delete "$\pm \alpha = \pm 10$" and insert -- $\pm \alpha = \pm 10°$ --.

In column 17, line 8, please delete "bounces since" and insert -- bounces, since --.

In column 19, line 1, please delete "$16^{m/5}!$" and insert -- $16^{m/5}?$ --.

In column 19, line 26, please delete "far" and insert -- for --.

In column 22, line 25, please delete "Interconnection" and insert -- interconnection --.

In column 22, line 42, please delete "displacing said" and insert -- displacing a said --.

In column 23, line 23, please delete "Interconnection" and insert -- interconnection --.

Signed and Sealed this

Twenty-fifth Day of September, 2007

JON W. DUDAS
*Director of the United States Patent and Trademark Office*